US011212507B2

(12) United States Patent
Rhyu

(10) Patent No.: US 11,212,507 B2
(45) Date of Patent: Dec. 28, 2021

(54) METHOD AND APPARATUS FOR PROCESSING THREE-DIMENSIONAL IMAGES

(71) Applicant: Samsung Electronics Co., Ltd., Suwon-si (KR)

(72) Inventor: Sungryeul Rhyu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/764,172

(22) PCT Filed: Nov. 16, 2018

(86) PCT No.: PCT/KR2018/014059
§ 371 (c)(1),
(2) Date: May 14, 2020

(87) PCT Pub. No.: WO2019/098728
PCT Pub. Date: May 23, 2019

(65) Prior Publication Data
US 2020/0389639 A1 Dec. 10, 2020

(30) Foreign Application Priority Data
Nov. 16, 2017 (KR) .......................... 10-2017-0153346

(51) Int. Cl.
*H04N 13/194* (2018.01)
*H04N 13/15* (2018.01)
(Continued)

(52) U.S. Cl.
CPC .......... *H04N 13/194* (2018.05); *H04N 13/15* (2018.05); *H04N 13/178* (2018.05); *H04N 13/388* (2018.05)

(58) Field of Classification Search
None
See application file for complete search history.

(56) References Cited

U.S. PATENT DOCUMENTS

2011/0298895 A1 12/2011 Tian et al.
2014/0003705 A1 1/2014 Taguchi et al.
(Continued)

FOREIGN PATENT DOCUMENTS

KR 10-2015-0024349 A 3/2015
KR 10-2016-0107357 A 9/2016
(Continued)

OTHER PUBLICATIONS

Byeongdoo Choi et al., WD on ISO/IEC 23000-20 Omnidirectional Media Application Format, N16189, ISO/IEC JTC1/SC29/WG11, Geneva, Switzerland, Jun. 3, 2016, pp. 1-42, See pp. 9, 10, 20; and figures 4-1, C-1.

*Primary Examiner* — Kate H Luo
(74) *Attorney, Agent, or Firm* — Jefferson IP Law, LLP

(57) ABSTRACT

A method for transmitting an image according to the present disclosure comprises the steps of: acquiring three-dimensional stereoscopic images; creating a color equirectangular projection (ERP) image and a depth ERP image from the three-dimensional stereoscopic images; and transmitting the color ERP image and the depth ERP image. Pixels of the color ERP image correspond to pixels of the depth ERP image, the pixels of the color ERP image comprise color information, and the pixels of the depth ERP image comprise depth information of corresponding pixels of the color ERP image. The step of creating the color ERP image and the depth ERP image from the three-dimensional stereoscopic images may comprise the steps of: forming a concentric sphere having a specific point on three-dimensional coordinates as a center point; mapping points of the three-dimensional stereoscopic images to the surface of the concentric sphere; generating the color ERP image on the basis of color information of the mapped points; and generating the depth ERP image on the basis of depth information of the mapped points. The three-dimensional stereoscopic images may (Continued)

include three-dimensional position information of the points and color information of the points.

16 Claims, 33 Drawing Sheets

(51) Int. Cl.
*H04N 13/178* (2018.01)
*H04N 13/388* (2018.01)

(56) References Cited

U.S. PATENT DOCUMENTS

2016/0323561 A1* 11/2016 Jin .................... H04N 5/907
2017/0084075 A1   3/2017 Robert et al.
2018/0278916 A1   9/2018 Kim et al.
2018/0332265 A1* 11/2018 Hwang ............. H04N 13/156
2019/0304160 A1* 10/2019 Izumi ............... H04N 13/178

FOREIGN PATENT DOCUMENTS

| KR | 10-2017-0017700 A | 2/2017 |
| KR | 10-2017-0043791 A | 4/2017 |
| KR | 10-2018-0108106 A | 10/2018 |

\* cited by examiner (a)

(b)

(a)

(b)

(a)

(b)

(a)

(b)

(a)

(b)

METHOD AND APPARATUS FOR PROCESSING THREE-DIMENSIONAL IMAGES

CROSS-REFERENCE TO RELATED APPLICATION(S)

This application is a U.S. National Stage application under 35 U.S.C. § 371 of an International application number PCT/KR2018/014059, filed on Nov. 16, 2018, which is based on and claimed priority of a Korean patent application number 10-2017-0153346, filed on Nov. 16, 2017, in the Korean Intellectual Property Office, the disclosure of which is incorporated by reference herein in its entirety.

TECHNICAL FIELD

The disclosure generally relates to a method and an apparatus for projecting a stereoscopic image.

BACKGROUND ART

The Internet is evolving from a human-oriented connection network in which humans generate and consume information, to an Internet of Things (IoT) network in which distributed elements, such as objects and the like, exchange and process information. Internet of Everything (IoE) technology may be an example of a combination of IoT technology and big data processing technology through a connection with a cloud server.

In order to implement the IoT, technical factors such as a sensing technique, wired/wireless communication and network infrastructure, service interface technology, and security technology are required, and thus research is being conducted on a sensor network, Machine-to-Machine (M2M) communication, Machine-Type Communication (MTC), and the like for a connection between objects.

In an IoT environment, through collection and analysis of data generated in connected objects, an intelligent Internet Technology (IT) service to create a new value for peoples' lives may be provided. The IoT may be applied to fields such as those of a smart home, a smart building, a smart city, a smart car, a connected car, a smart grid, health care, a smart home appliance, or high-tech medical services through the convergence of the conventional Information Technology (IT) and various industries.

Meanwhile, the Moving Picture Experts Group (MPEG) that is an international organization for standardization related to multimedia established standardization of MPEG-1 in 1988 and then subsequently established standardization of MPEG-2, MPEG-4, MPEG-7, and MPEG-21. The Multimedia Application Format (MAF) increases the value of use of the standard by actively responding to industrial demands through the use of not only the conventional MPEG standards but also non-MPEG standards. A main object of the MAF standardization is to provide an opportunity of easily using the MPEG technology in industries. That is, the MAF standardization aims at provision of a standardized file format of a specific application for the wide use of the corresponding application and the supply of the MPEG standard.

Meanwhile, a method of projecting a stereoscopic image onto a plane may include a method of mapping point cloud information in a three-dimensional coordinate to another three-dimensional coordinate system. The point cloud information is information stored in the form of points.

In another method of projecting a stereoscopic image onto a plane, the closest point is mapped to XY, YZ, and XZ planes to generate a patch. Here, a process of mapping as many patches as possible to a 2D plane at intervals of 16×16 is referred to as a "packing process". In the prior art, point information in a 3D coordinate is mapped to a 2D plane in the state in which one piece information on three dimensions such as XY, YZ, and XZ is subtracted. However, in such a method, distances of points mapped to the plane can be mapped to patches only within a mapping interval (0 to 255 intervals, 8 bits), and thus intervals larger than or equal to 256 (larger than or equal to 9 bits) may be needed or new patches should be provided to map more remote points.

DETAILED DESCRIPTION OF THE INVENTION

Technical Problem

The disclosure provides a stereoscopic image projection method and apparatus for mapping points to blocks within a smaller interval.

The disclosure provides a stereoscopic image projection method and apparatus for mapping points to blocks using blocks having a free angle.

The disclosure provides a stereoscopic image projection method and apparatus for mapping points to blocks using a predetermined pattern.

Technical Solution

A method of transmitting an image according to the disclosure includes: acquiring a 3D stereoscopic image; generating a color equirectangular projection (ERP) image and a depth ERP image from the 3D stereoscopic image; and transmitting the color ERP image and the depth ERP image.

Pixels of the color ERP image may correspond to pixels of the depth ERP image, the pixels of the color ERP image may include color information, and the pixels of the depth ERP image may include depth information of the corresponding pixels of the color ERP image.

The generating of the color ERP image and the depth ERP image from the 3D stereoscopic image may include; forming concentric spheres having a feature point on a 3D coordinate as a center point; mapping points of the 3D stereoscopic image to surfaces of the concentric spheres; generating the color ERP image, based on color information of the mapped points; and generating the depth ERP image, based on depth information of the mapped points. The 3D stereoscopic image may include 3D location information of points and color information of the points. The 3D stereoscopic image may further include at least one piece of text information of the points, reflectivity information of the points, and transparency information of the points.

The method of transmitting the image according to the disclosure may further include transmitting data including occupancy map information. The occupancy map information may include information indicating a location at which there is no image data of the color ERP image and the depth ERP image. The occupancy map information is generated through metadata or an ERP image.

A method of reconstructing a 3D stereoscopic image according to the disclosure includes: receiving a color ERP image and a depth ERP image; and reconstructing a 3D stereoscopic image, based on the color ERP image and the depth ERP image, wherein pixels of the color ERP image correspond to pixels of the depth ERP image, the pixels of the color ERP image include color information, and the pixels of the depth ERP image include depth information of corresponding pixels of the color ERP image.

The reconstructing of the 3D stereoscopic image on the basis of the color ERP image and the depth ERP image may include acquiring location information of a point corresponding to a pixel on the basis of depth information of the pixel of the depth ERP image and a location of the pixel of the depth ERP image and reconstructing location information and color information of a point of the 3D stereoscopic image by combining color information of a pixel of the color ERP image corresponding to the pixel of the depth ERP image and the corresponding location information of the pixel.

A method of projecting a stereoscopic image according to the disclosure may include: identifying a point value corresponding to an object of the stereoscopic object; and mapping the point value to a block based on a pattern, and the pattern is determined on the basis of distances of point values orthogonal to a plane and an offset value of the pattern.

A method of projecting a stereoscopic image according to the disclosure may include: identifying a point value corresponding to an object of the stereoscopic object; and mapping the point value to a block based on an angle, and the angle is determined on the basis of a sum of distances of point values having the smallest value.

An apparatus for projecting a stereoscopic image according to the disclosure may include a transceiver configured to transmit and receive data; and a controller configured to identify a point value corresponding to an object of the stereoscopic image and mapping the point value to a block based on a pattern, and the pattern is determined on the basis of distances between points orthogonal to a plane and an offset value of the pattern.

An apparatus for projecting a stereoscopic image according to the disclosure may include a transceiver configured to transmit and receive data; and a controller configured to identify a point value corresponding to an object of the stereoscopic image and mapping the point value to a block based on an angle, and the angle is determined on the basis of a sum of distances of point values having the smallest value.

A method of decoding a stereoscopic image according to the disclosure includes: receiving data; determining a pattern; acquiring block angle information and block-point distance information on the basis of the pattern; acquiring a point value corresponding to an object of the stereoscopic image on the basis of the angle information and the block-point distance information; and decoding the data on the basis of the point value, and the pattern is determined on the basis of a distance of the point values orthogonal plane and an offset value of the pattern.

A method of decoding a stereoscopic image according to the disclosure includes: receiving data; acquiring block angle information and block-point distance information from a block included in the data; acquiring a point value on the basis of the angle information and the block-point distance information; and decoding the data on the basis of the point value, wherein the angle is determined to map the point value to a sum of distances having the smallest value.

An apparatus for decoding a stereoscopic image according to the disclosure includes: a transceiver configured to transmit and receive data; and a controller configured to perform control to receive the data, determine a pattern, acquire block angle information and block-point distance information on the basis of the pattern, acquire a point value corresponding to an object of the stereoscopic image on the basis of the angle information and the block-point distance information, and decode the data on the basis of the point value, and the pattern is determined on the basis of a distance of the point value orthogonal to a plane and an offset of the pattern.

An apparatus for decoding a stereoscopic image according to the disclosure includes: a transceiver configured to transmit and receive data; and a controller configured to perform control to receive the data, acquire block angle information and block-point distance information from a block included in the data, acquire a point value on the basis of the angle information and the block-point distance information, and decode the data on the basis of the point value, and the angle is determined to map the point value to a sum of distances having the smallest value.

Advantageous Effects

The disclosure can map points to blocks using a smaller interval.

The disclosure can reduce the size of information because a distance between a pattern applied to a block and a point is smaller than that of a plane.

The disclosure can express points using a block having a free angle and thus reduce energy required for the expression.

The disclosure can map points to blocks using a predetermined pattern and thus effectively project a stereoscopic image to a 2D plane.

The disclosure can project an object in an actual space to a virtual space.

Effects which can be acquired by the disclosure are not limited to the above described effects, and other effects that have not been mentioned may be clearly understood by those skilled in the art from the following description.

MODE FOR CARRYING OUT THE INVENTION

Hereinafter, embodiments of the disclosure will be described in detail with reference to the accompanying drawings. In the following description of the disclosure, a detailed description of known configurations or functions incorporated herein will be omitted when it is determined that the detailed description may make the subject matter of the disclosure unclear. The terms as described below are defined in consideration of the functions in the embodiments, and the meaning of the terms may vary according to the intention of a user or operator, convention, or the like. Therefore, the definitions of the terms should be made based on the contents throughout the specification.

In the detailed description of the disclosure, an example of interpretable meanings of some terms used in the disclosure is proposed. However, it is noted that the terms are not limited to the examples of the construable meanings which are proposed below. Prior to a detailed description of the disclosure, point information and a point value used in the specification have the same meaning. An object in the specification means an object in a three-dimensional space.

The disclosure provides a method and an apparatus for mapping point information in a three-dimensional space to a two-dimensional plane block (pixel block having the size of 2n×2m). To this end, in a first embodiment of the disclosure, points are mapped to blocks based on a free angle.

In the disclosure, points are mapped to blocks based on a pattern. The disclosure proposes a pattern using method of effectively indicating a distance between points projected onto plane blocks.

Figure 1:
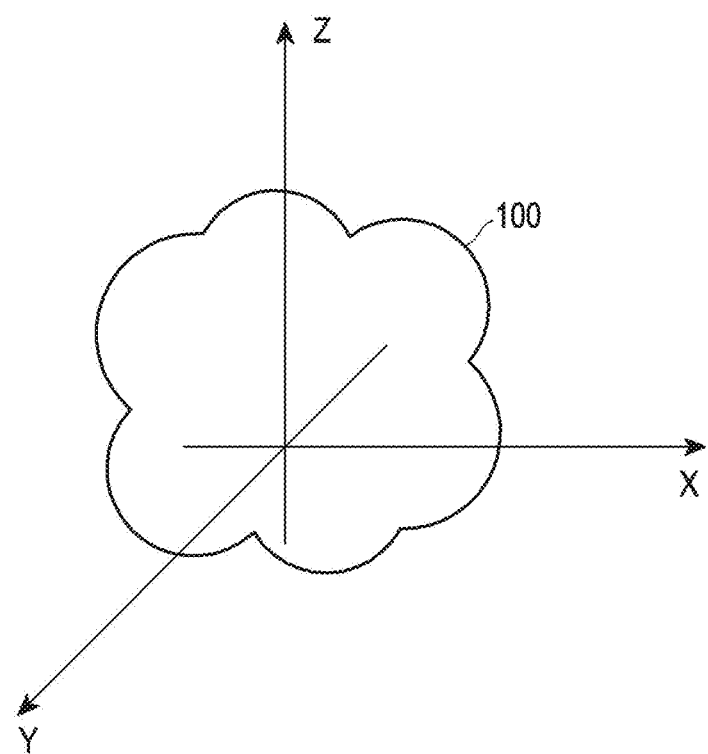
FIG. 1 illustrates the surface of an object in a three-dimensional space according to the disclosure.

FIG. 1 illustrates the surface of an object in a three-dimensional space according to the disclosure.

Referring to FIG. 1, the surface 100 of the object in the three-dimensional space is recognized in units of points and mapped to a virtual space, like pixels of a 2D image.

The point has coordinate information indicating coordinates (X, Y, Z) of the object, color information such as R, G, and B, and other attributes (for example, reflectivity and transparency).

Information in the 3D space may be expressed as Table 1 below.

TABLE 1

```
ply
format ascii 1.0
element vertex 765821
property float x
property float y
property float z
property uchar red
property uchar green
property uchar blue
end_header
211 63 61 133 104 77
210 63 63 128 97 69
211 62 63 126 97 71
211 63 62 130 100 73
211 63 63 129 98 71
```

Referring to Table 1 above, the information in the 3D space includes coordinate information such as X, Y, and Z, and color information such as R, G, and B. For example, 211, 63, 61, 210, 63, 63, 211, 62, 63, 211, 63, 62, 211, 63, and 63 in Table 1 above indicate coordinate information such as X, Y, and Z. On the other hand, for example, 133, 104, 77, 128, 97, 69, 126, 97, 71, 130, 100, 73, 129, 98, and 71 in Table 1 above indicate color information such as R, G, and B.

Figure 2:
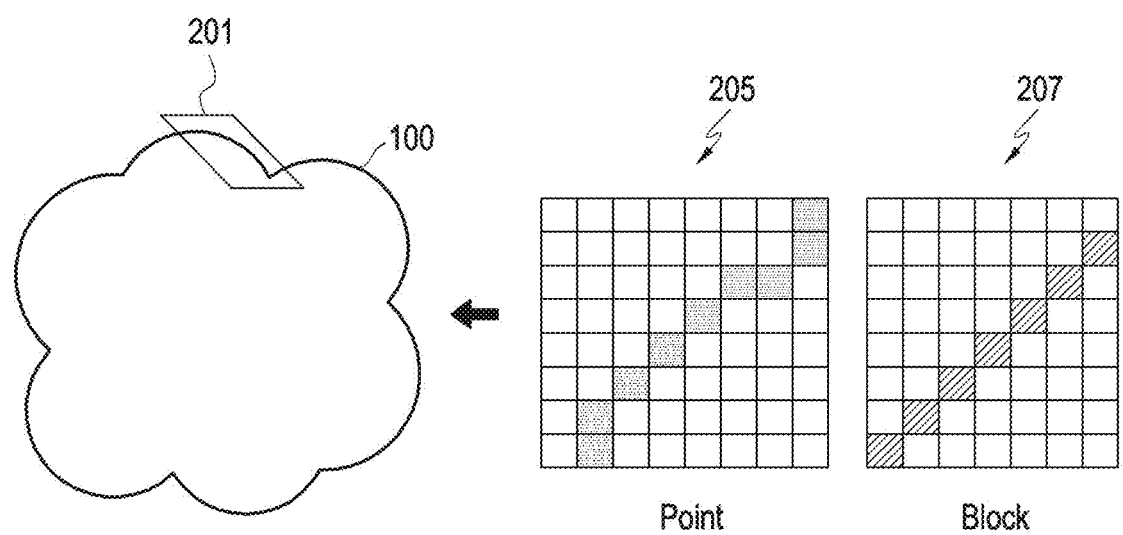
FIG. 2 illustrates the surface of an object in a 3D space when an initial block according to the disclosure inclines in a predetermined direction.

FIG. 2 illustrates the surface of an object in a 3D space when an initial block according to the disclosure inclines in a predetermined direction.

FIG. 2 assumes that the number of blocks is one, and a block 201 is referred to as an initial block.

The initial block 201 may incline on the object surface 201 in a predetermined direction, and, for example, one point 205 may be mapped to be the closest to an upper part of the block 207 and another one point 205 may be mapped to be the closest to a lower part of the block 207. As a direction and an angle of the block on a 3D coordinate system has the complete degree of freedom, an error is smaller, but the number of bits of a data constant for expressing the same increases. Accordingly, the angle is divided in units of 45 degrees or 22.5 degrees in the disclosure, but may be divided in units of smaller angles (for example, 10 degrees).

Figure 3:
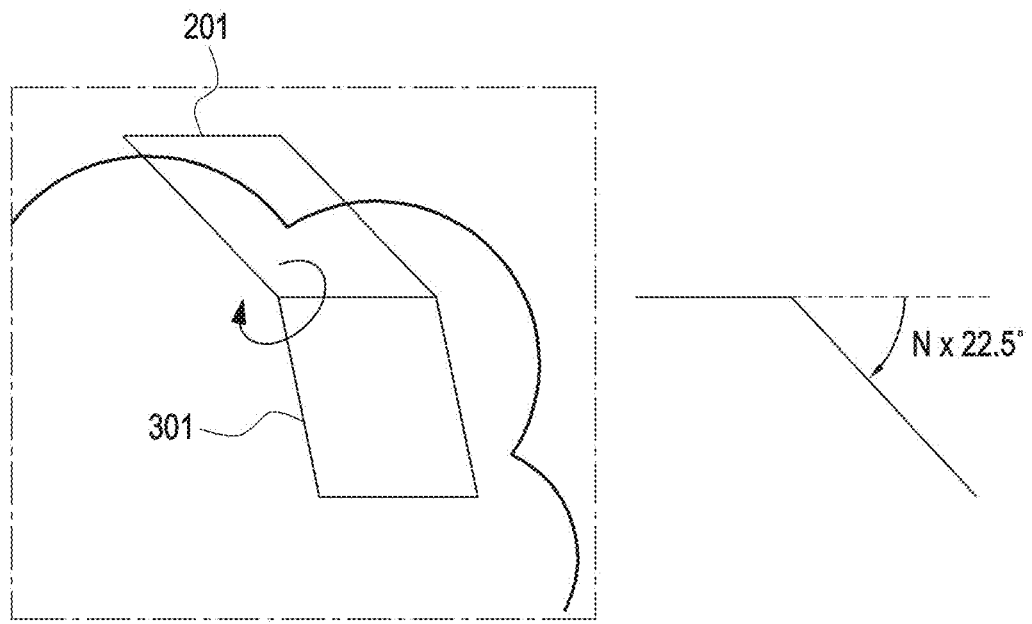
FIG. 3 illustrates the surface of an object in a 3D space when an initial block inclines in a predetermined direction and there is another block (next block) other than the initial block according to the disclosure.

FIG. 3 illustrates the surface of an object in a 3D space when an initial block inclines in a predetermined direction and there is another block (next block) other than the initial block according to the disclosure.

FIG. 3 assumes that the number of blocks is two, and the block 201 is referred to as an initial block and a block 301 is referred to as a next block.

The block 301 is a block adjacent to the block 201 and has an angle, for example, 22.5 degrees from the block 201.

Figure 4:
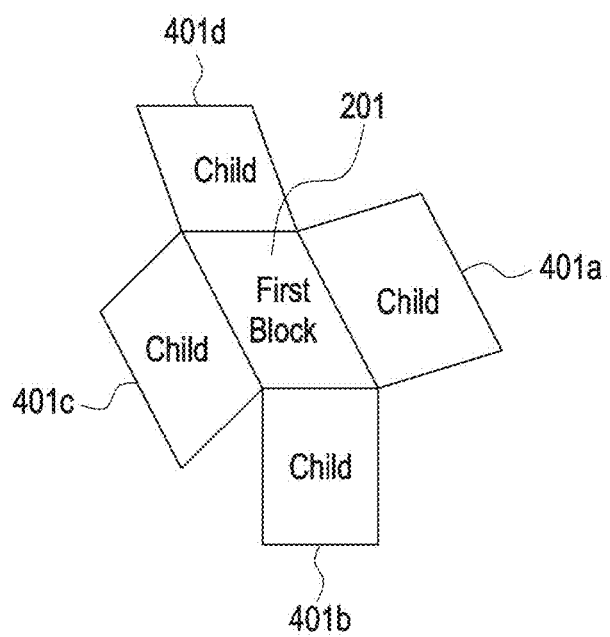
FIG. 4 illustrates the case in which there are an initial block and a plurality of child blocks having the initial block as a parent block according to the disclosure.

FIG. 4 illustrates the case in which there are an initial block and a plurality of child blocks having the initial block as a parent block according to the disclosure.

Blocks (next blocks) 401a to 401b are arranged in directions extended from, for example, upper, lower, left, and right sides of the initial block 201, and correspond to child blocks having the initial block 201 as the parent.

Figure 5:
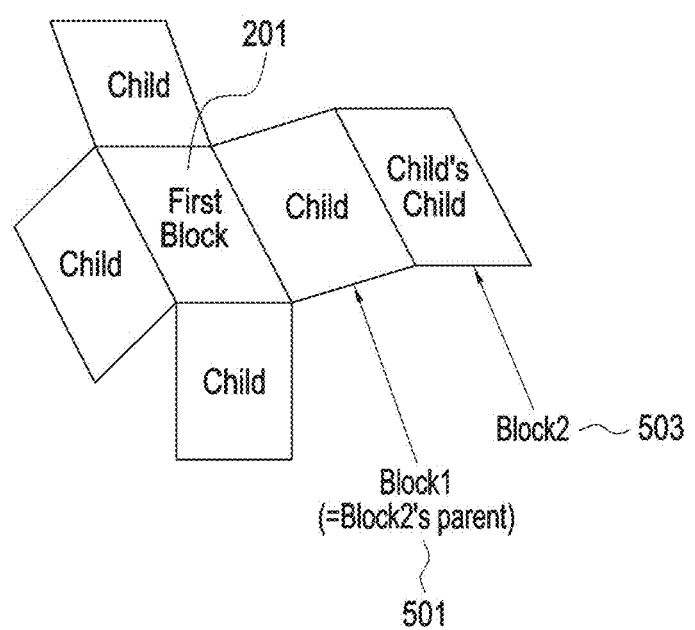
FIG. 5 illustrates the case in which there are an initial block and child blocks having the initial block as a parent block and one of the child blocks becomes the parent block according to the disclosure.

FIG. 5 illustrates the case in which there are an initial block and child blocks having the initial block as a parent block and one of the child blocks becomes the parent block according to the disclosure.

The child blocks are arranged in directions extended from, for example, upper, lower, left, and right sides of the initial block 201. One (block #1) 501 of the child blocks may have another child block (block #2) 503 in which case block #1 501 becomes a parent block of block #2 503.

Figure 6:
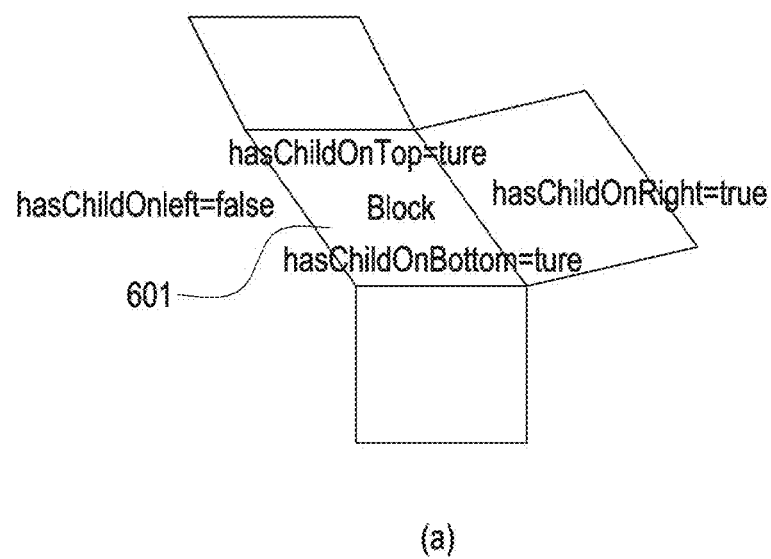
FIG. 6 illustrates information included in a parent block when the parent block and child blocks exist according to the disclosure.
Figure 6:
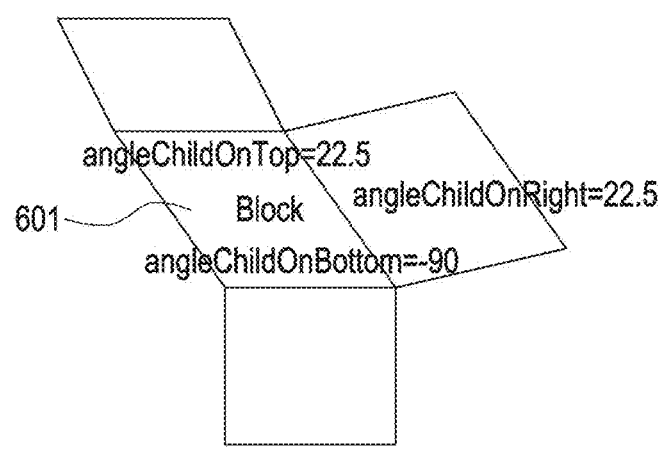

FIG. 6 illustrates information included in a parent block when the parent block and child blocks exist according to the disclosure.

The parent block includes information indicating whether a child block exists in three or four directions and, when the child block exists, includes progress angle information of the child block from one direction of the parent block.

In Part (a) of FIG. 6, for example, information (hasChildOnTop=true) included in a parent block 601 indicates that a child block exists on the top, and information (hasChildOnLeft=false) included in the parent block 601 indicates that no child block exists on the left side. Information (hasChildOnRight=true) included in the parent block 601 indicates that a child block exists on the right side, and information (hasChildOnBottom=true) included in the parent block 601 indicates that a child block exists on the bottom.

In Part (b) of FIG. 6, for example, information (angleChildOnTop=22.5) included in the parent block 601 indicates that a child block exists on the top at an angle of 22.5 degrees, and information (hasChildOnLeft=false) included in the parent block 601 indicates that no child block exists on the left side. Information (angleChildOnRight=22.5) included in the parent block 601 indicates that a child block exists on the right side at an angle of 22.5 degrees, and information (angleChildOnBottom=−90) included in the parent block 601 indicates that a child block exists on the bottom at an angle of −90 degrees.

Figure 7:
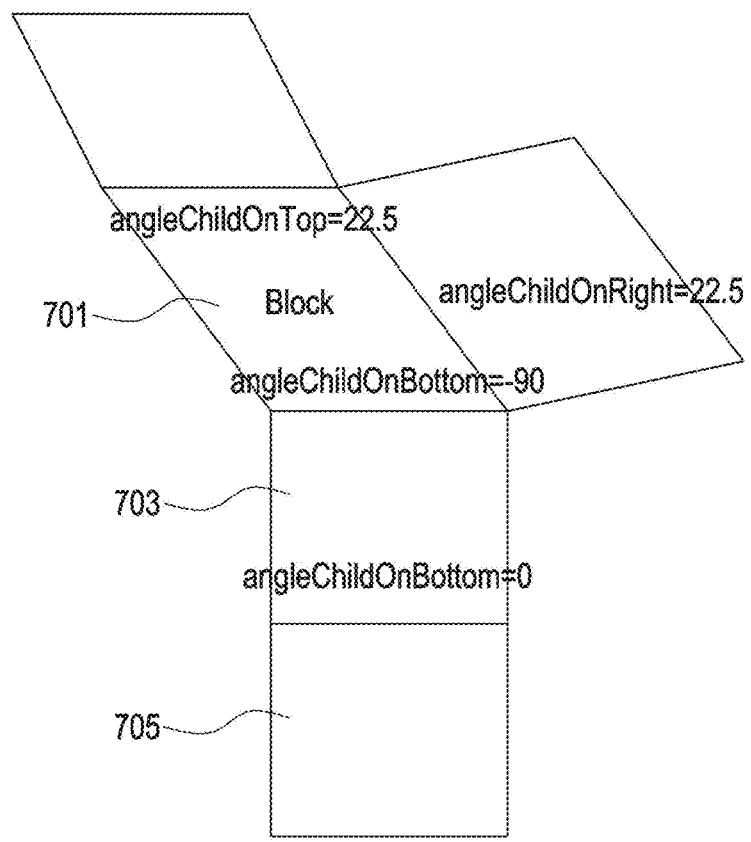
FIG. 7 illustrates an example in which a parent block and child blocks exist on the same plane according to the disclosure.

FIG. 7 illustrates an example in which a parent block and a child block exist on the same plane according to the disclosure.

Information (angleChildOnTop=22.5) included in a parent block 701 indicates that a child block exists on the top at an angle of 22.5 degrees, information (angleChildOnRight=22.5) included in the parent block 701 indicates that a child block exists on the right side of the parent block 701 at an angle of 22.5 degrees, and information (angleChildOnBottom=−90) included in the parent block 701 indicates that a child block exists on the bottom at an angle of −90 degrees.

Here, when the child block 703 and another child block 705 exist on the same plane, a progress angle of the other child block 705 is 0 degrees. Accordingly, information included in the child block 703 may be expressed as "angleChildOnBottom=0".

The child blocks have information on child blocks in a direction of the parent block and the remaining three directions among the four directions.

Figure 8:
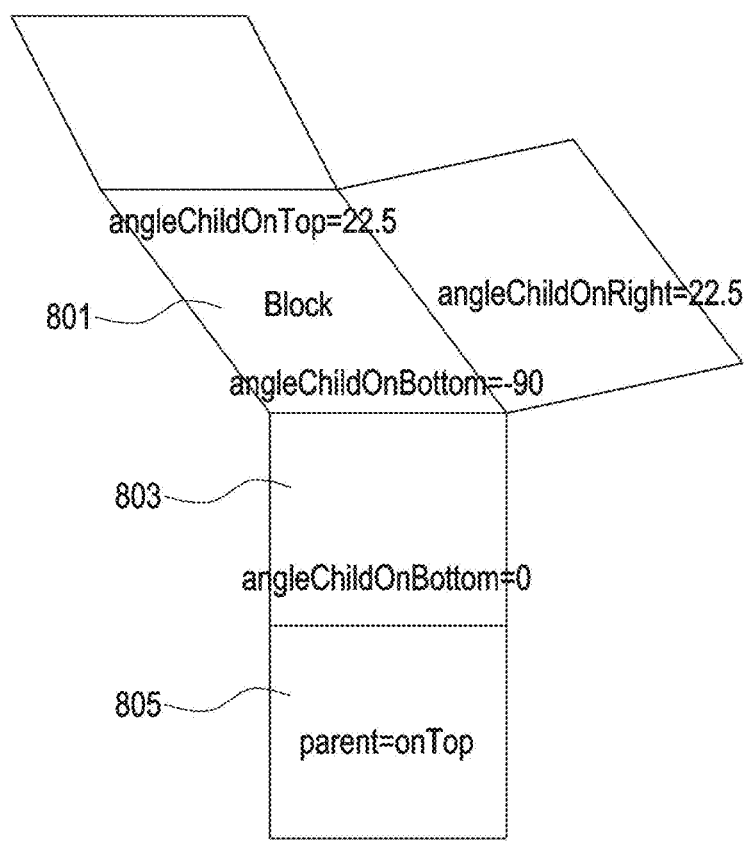
FIG. 8 illustrates another example in which a parent block and a child block exist on the same plane according to the disclosure.

FIG. 8 illustrates another example in which a parent block and a child block exist on the same plane according to the disclosure.

Information (angleChildOnTop=22.5) included in a parent block 801 indicates that a child block exists on the top at an angle of 22.5 degrees, information (angleChildOnRight=22.5) included in the parent block 801 indicates that a child block exists on the right side of the parent block 801 at an angle of 22.5 degrees, and information (angleChildOnBottom=−90) included in the parent block 801 indicates that a child block exists on the bottom at an angle of −90 degrees.

Here, when the child block 803 and another child block 805 exist on the same plane, a progress angle of the other child block 805 is 0 degrees. Accordingly, information included in the child block 803 may be expressed as "angleChildOnBottom=0". Further, information included in the other child block 805 indicates that the parent block exists on the top. Accordingly, information included in the other child block 805 may be expressed as "parent=onTOP".

Figure 9:
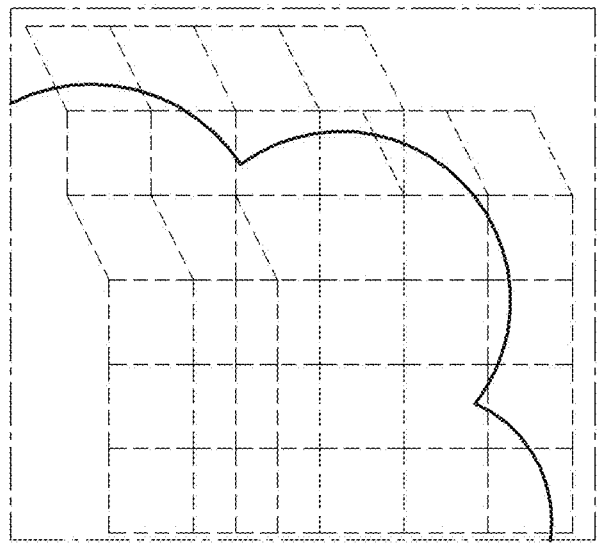
FIG. 9 illustrates blocks and points according to the disclosure.
Figure 9:
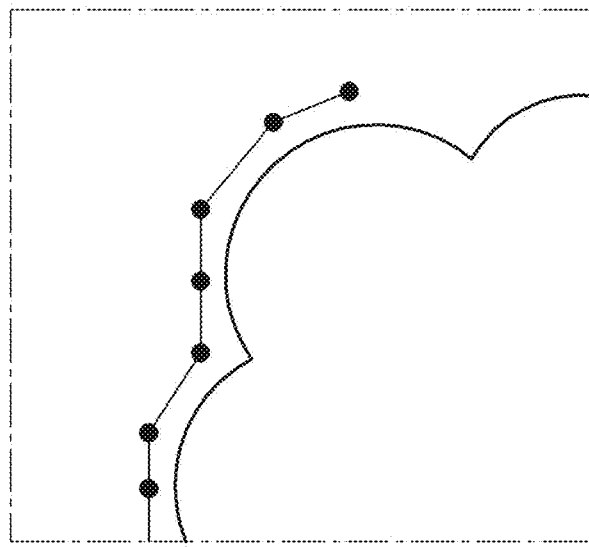

FIG. 9 illustrates blocks and points according to the disclosure.

Part (a) of FIG. 9 illustrates a 3D space as a plane block, and Part (b) of FIG. 9 illustrates a 3D space as points.

Part (a) of FIG. 9 illustrates plane blocks covering a 3D object, and Part (b) of FIG. 9 is a cross-sectional view of Part (a) of FIG. 9.

The block is located in a 3D space near the object, and an angle of the block is determined to minimize a sum of distances between the block and points on the surface of the object existing in the 3D space. When the angle of the block is determined to minimize the sum of the distances between the points of the object and the block, a compression effect can be increased by mapping the points to the block. The points of the object may be points on the surface of the object or points within the object. In general, the points on the surface of the object are first mapped to the patch and then the points within the object are sequentially mapped to the patch. Until all points are completely processed, the points of the object are mapped to the patch.

Figure 10:
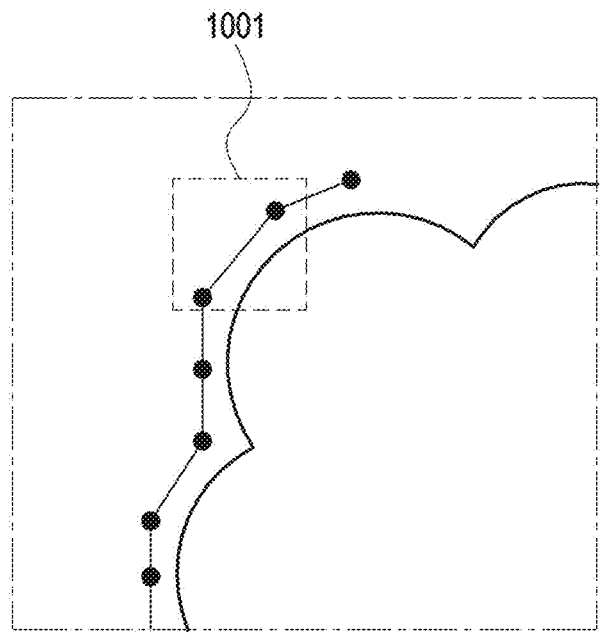
FIG. 10 illustrates mapping of points 1001 in a 3D space to a block according to the disclosure.
Figure 10:
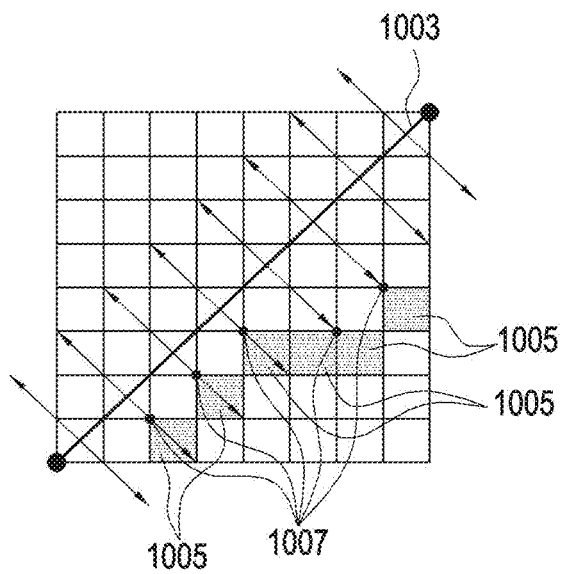

FIG. 10 illustrates a method of mapping points 1005 of an object existing in a 3D space to a block 1003 according to the disclosure.

Part (a) of FIG. 10 is a cross-sectional view illustrating the arrangement of blocks in which points of the object existing in the 3D space are mapped to blocks (patches). Part (b) of FIG. 10 is a view enlarged from one part 1001 of Part (a) of FIG. 10.

Referring to Part (b) of FIG. 10, a sum of block-point distances is determined on the basis of a sum of orthogonal distances between the plane 1003 of the block and the points 1005. The sum of the orthogonal distances between the plane 1003 of the block and the points 1005 is a sum of distances between orthogonal points 1005 on the planes 1003 of the respective blocks 1005.

Information on the block 1003 includes information on an initial block and information on child blocks. That is, the information on the block 1003 includes, for example, the information on the initial block and location information (that is, angles) of the child blocks. In the specification, location information of blocks include angle information. The information on the blocks may be included in metadata or in block data.

Figure 11:
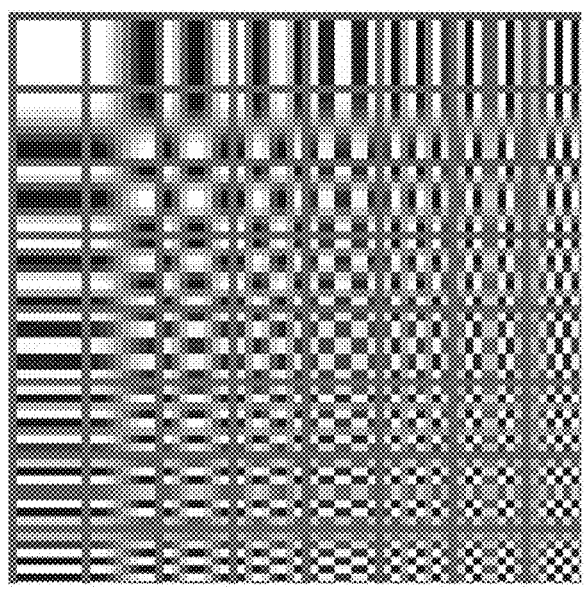
FIG. 11 illustrates a method of projecting a stereoscopic image according to the disclosure.

FIG. 11 illustrates a method of projecting a stereoscopic image according to the disclosure.

According to the disclosure, points are mapped to a block based on a pattern, and FIG. 11 illustrates a pattern 1101.

The block may be configured to have one of predefined patterns 1101. The pattern in the disclosure can be shared by a transmitter and a receiver, and may be stored in each of the transmitter and the receiver.

The pattern 1101 is determined on the basis of the number of sums of the number of cases in which an offset values of each coordinate of the block is configured by 0 to 2 stages as illustrated in FIG. 11. In FIG. 11, the width is the same as the length, coordinates are divided into, for example, 8 stages, and the number of offset vales is, for example, 8, and thus 64 patterns may be generated.

It is preferred that mapping between blocks and points is determined on the basis of one pattern having the smallest sum of remainders obtained by dividing distances of points orthogonal to the block plane by an offset value.

Figure 12:
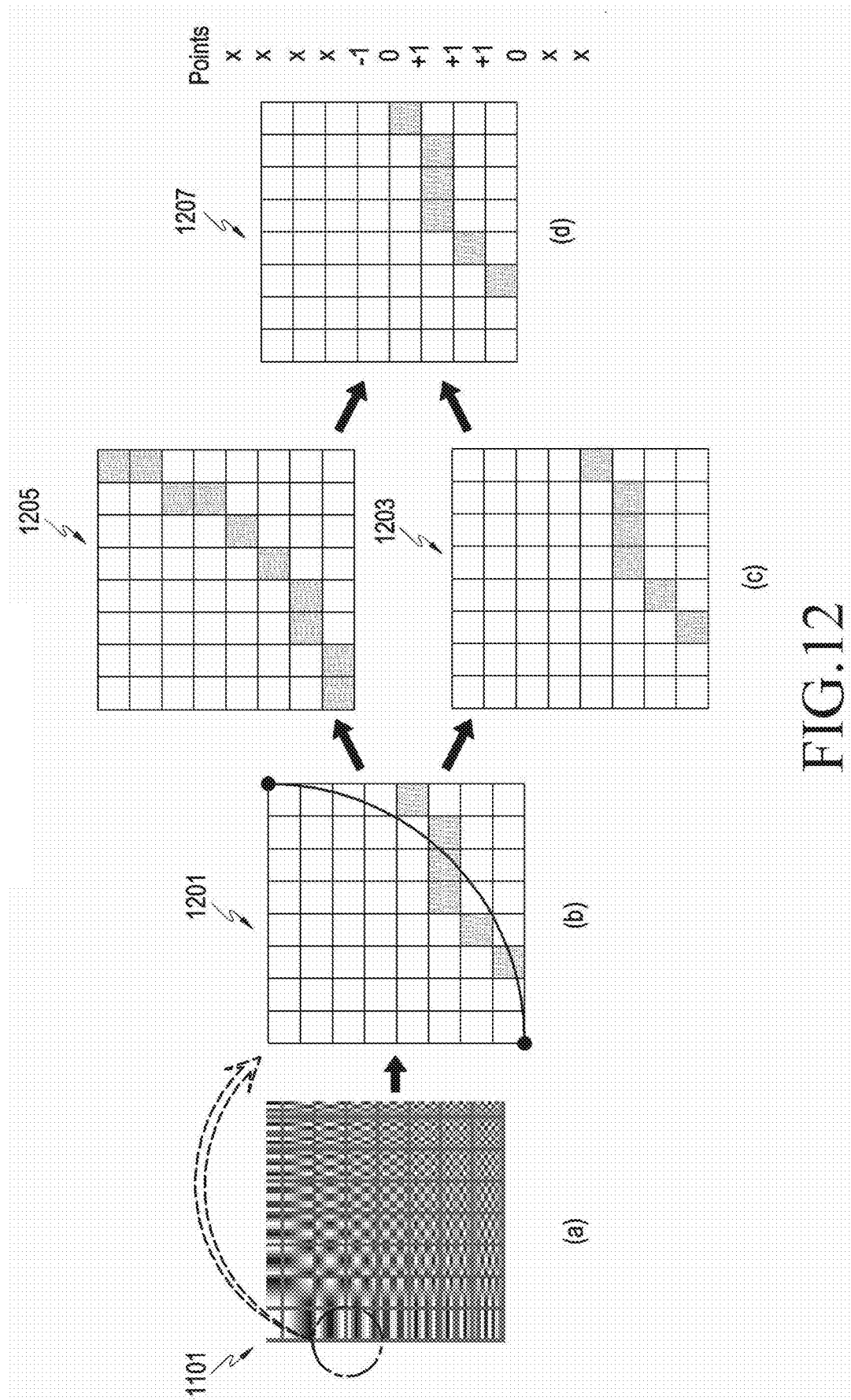
FIG. 12 illustrates in detail a method of projecting a stereoscopic image according to the disclosure.

FIG. 12 illustrates in detail a method of projecting a stereoscopic image according to the disclosure.

In Part (a) of FIG. 12, one of 64 patterns 1101 is determined. The pattern may be determined on the basis of distances of point values orthogonal to the plane and an offset value of the pattern, and location information of the block and a block-point distance may be derived through the determined pattern.

A block 1201 of Part (b) of FIG. 12 indicates a block to which points are mapped on the basis of a determined pattern. It is preferred that mapping between blocks and points is determined on the basis of one pattern having the smallest sum of remainders obtained by dividing distances of points orthogonal to the block plane by an offset value.

Part (c) of FIG. 12 illustrates the block of Part (b) of FIG. 12 and another block.

Part (d) of FIG. 12 illustrates a process indicating a result of performing exclusive or (XOR) on the block of Part (b) of FIG. 12 and the other block in Part (c) of FIG. 12. Performing the XOR is only an example, and may be omitted. In addition to the method of performing the XOR, a method of taking an absolute value and performing subtraction. The method of taking the absolute value and performing subtraction may be also omitted.

Point values may be acquired through the block of Part (d) of FIG. 12.

Figure 13A:
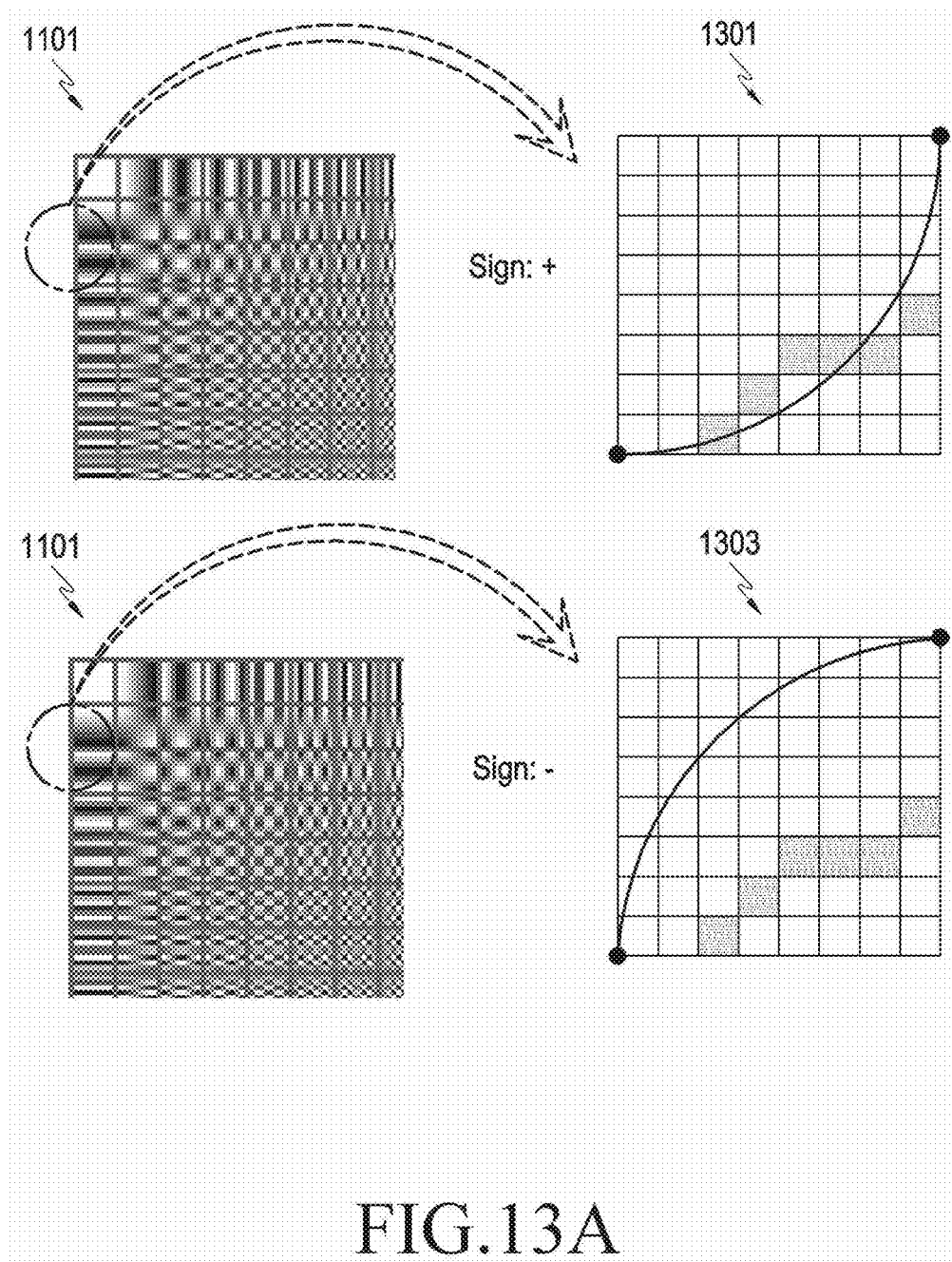
FIGS. 13A and 13B illustrate in detail another example of the method of projecting the stereoscopic image according to the disclosure.
Figure 13B:
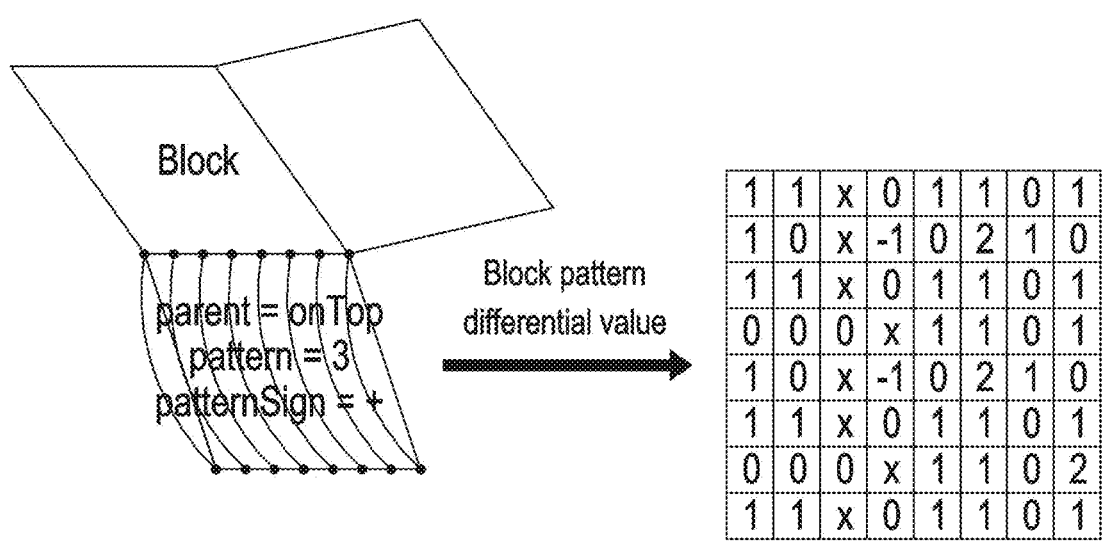

FIGS. 13A and 13B illustrate in detail another example of the method of projecting the stereoscopic image according to the disclosure.

The pattern is inverted in a positive direction or a negative direction such that the pattern is mapped to points as indicated by reference numerals 1301 and 1303 in FIG. 13A, and a positive/negative differential value from which an offset of the pattern and a point distance are subtracted is determined in FIG. 13B At this time, the block may include a pattern number and a pattern direction (positive direction/ negative direction) and may further include a positive/ negative differential value. Block information may have information on a pattern used by the blocks. The pattern information may include the size of width and length of the pattern, the number of patterns, or the pattern itself.

According to the disclosure, a block is unfolded for points to be stored and mapped according to a distance between the block and the point. If there the remaining points except for points mapped through the unfolding of a first block, a second block is unfolded. If there is no remaining point to be mapped after the repeated unfolding of the blocks, unfolding of the block is stopped. Initial block information and child block information are stored for each unfolding.

Figure 14:
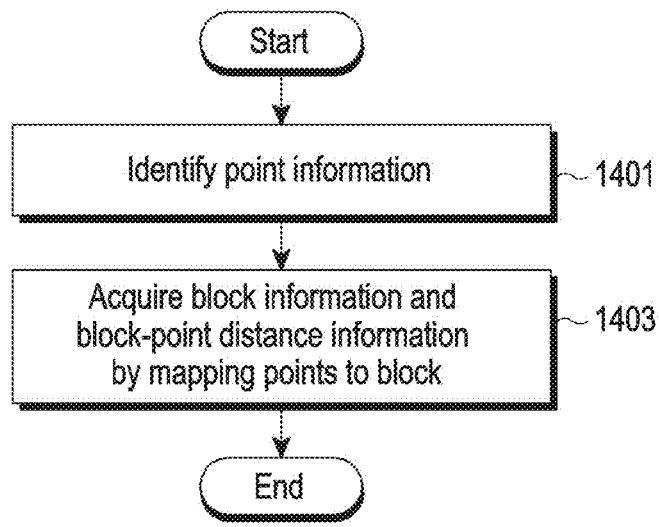
FIG. 14 is a flowchart illustrating an operation of a transmitter according to the disclosure.

FIG. 14 is a flowchart illustrating an operation of a transmitter according to the disclosure.

The transmitter identifies point values in step 1401.

The transmitter maps the point values to a block and acquires block information and block-point distance information from the block. The block information includes angle information. The angle information is determined such that the point values are mapped to the smallest sum of distances.

Figure 15:
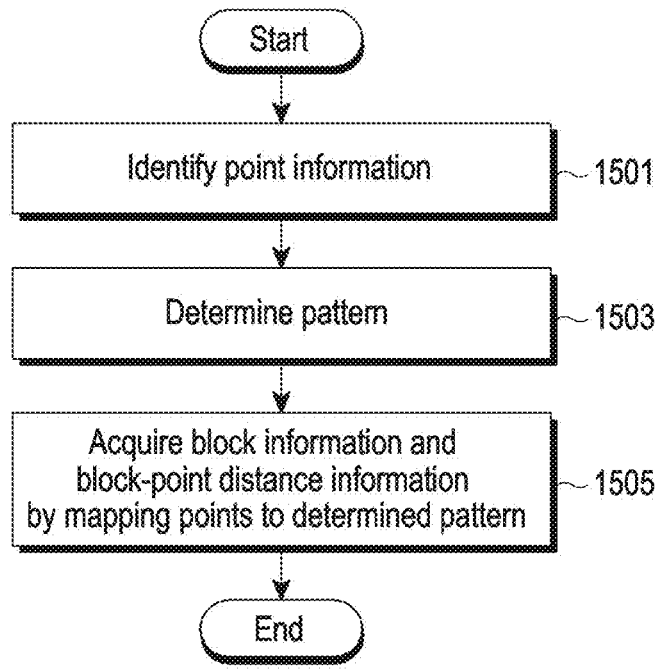
FIG. 15 is a flowchart illustrating an operation of a transmitter according to the disclosure.

FIG. 15 is a flowchart illustrating an operation of a transmitter according to the disclosure.

The transmitter identifies point values in step 1501. The transmitter determines a pattern in step 1503. The pattern is determined on the basis of a distance between points orthogonal to the plane and an offset value of the pattern.

The transmitter may map the point values to the determined pattern and acquire block information and block-point distance information from the pattern in step 1505.

Figure 16:
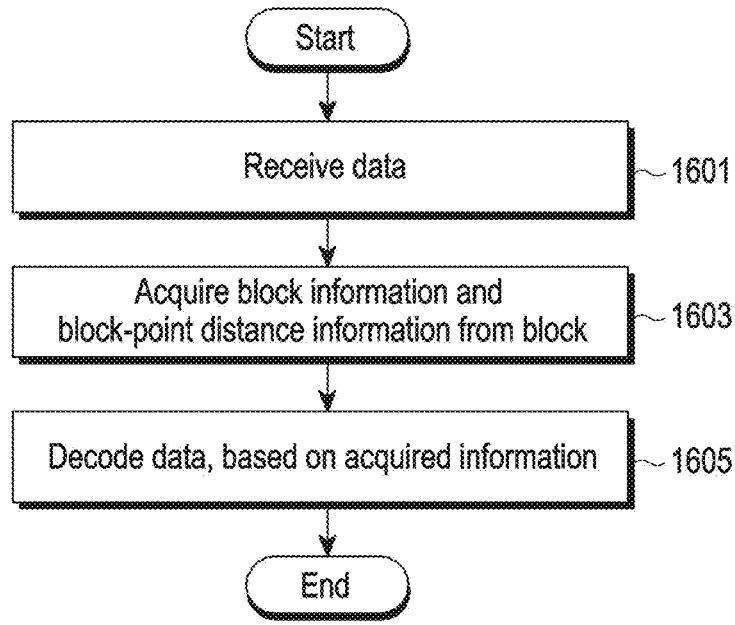
FIG. 16 is a flowchart illustrating an operation of a receiver according to the disclosure.

FIG. 16 is a flowchart illustrating an operation of a receiver according to the disclosure.

The receiver receives data in step 1601.

The receiver acquires block information and block-point distance information from the block in step 1603.

The receiver decodes data on the basis of the acquired information in step 1605.

Figure 17:
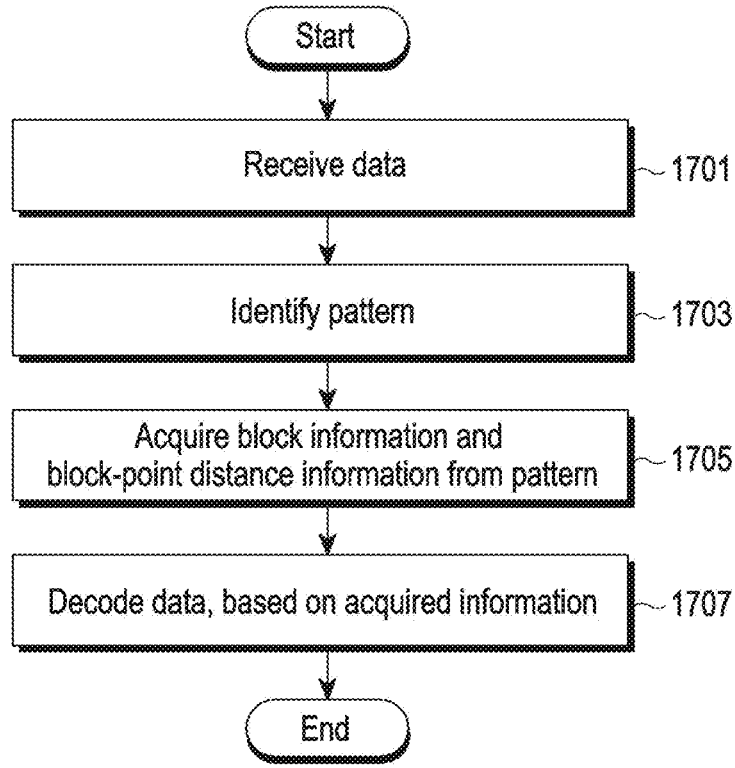
FIG. 17 is a flowchart illustrating an operation of a receiver according to the disclosure.

FIG. 17 is a flowchart illustrating an operation of a receiver according to the disclosure.

The receiver receives data from the transmitter in step 1701. The receiver identifies a pattern in step 1703. The pattern is determined on the basis of a distance between the point values orthogonal to the plane and an offset value of the pattern. The receiver acquires block information and block-point distance information from the determined pattern in step 1705.

The receiver decodes data on the basis of the acquired information in step 1707.

Figure 18:
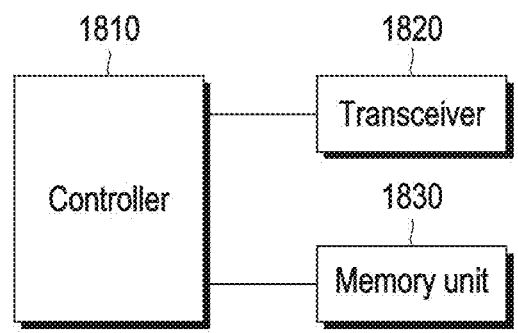
FIG. 18 is a block diagram of a transmitter according to the disclosure.

FIG. 18 is a block diagram of a transmitter according to the disclosure.

Referring to FIG. 18, the transmitter includes a transceiver 1820, a memory unit 1830, and a controller 1810.

The transceiver 1820 of the transmitter includes each of a transmission module and a reception module for transmitting and receiving data to and from a receiver according to the disclosure.

The controller 1810 performs the operation of the transmitter described with reference to FIGS. 1 to 15. That is, the controller 1810 identifies point values corresponding to an object, maps the point values to a block based on a pattern, and determines distances of point values orthogonal to the plane and an offset value of the pattern.

The memory unit 1030 stores various pieces of data of the transmitter.

Figure 19:
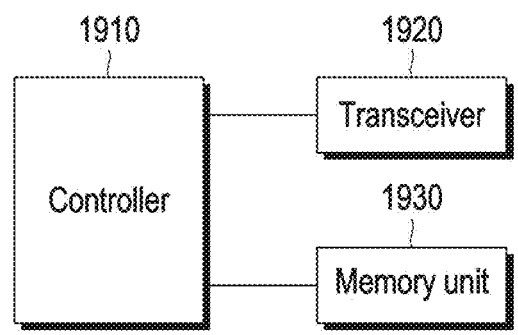
FIG. 19 is a block diagram of a receiver according to the disclosure.

FIG. 19 is a block diagram of a receiver according to the disclosure.

Referring to FIG. 19, the receiver includes a transceiver 1920, a memory unit 1930, and a controller 1910.

The transceiver 1920 of the receiver includes each of a transmission module and a reception module for transmitting and receiving data to and from a centralized remote channel monitor according to the disclosure.

The controller 1910 performs the operation of the receiver described with reference to FIGS. 1 to 13B and FIGS. 16 to 17. That is, the controller 1910 performs control to receive the data, determine a pattern, acquire block angle information and block-point distance information on the basis of the pattern, acquire point values corresponding to an object of the stereoscopic image on the basis of the angle information and the block-point distance information, and decode the data on the basis of the point values. The pattern is determined on the basis of a distance between the point values orthogonal to the plane and an offset value of the pattern.

That is, the controller 1910 performs control to receive the data, acquire block angle information and block-point distance information from a block including the data, acquire point values on the basis of the angle information and the block-point distance information, and decode the data on the basis of the point values, and the angle is determined such that the point values are mapped to the smallest sum of distances.

Figure 20:
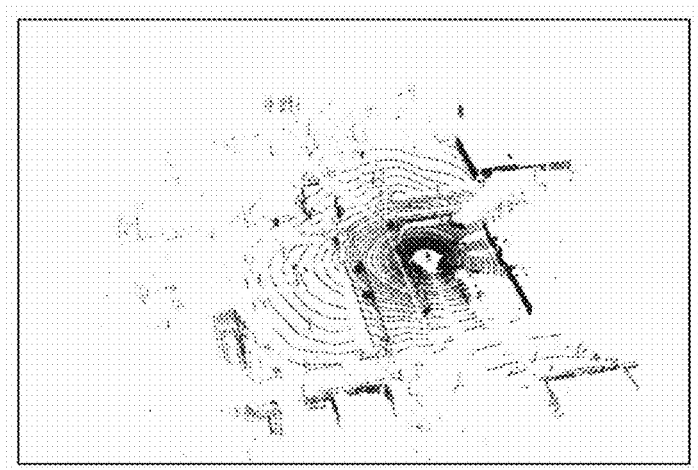
FIG. 20 illustrates an example of a dynamically acquired point cloud image according to the disclosure.

FIG. 20 illustrates an example of a dynamically acquired point cloud image according to the disclosure.

The disclosure proposes text model category 3 (TMC3) point cloud compression (PCC) using test model category 2 (TMC2).

According to an image processing method, 3D image information may be divided into object image information and scene image information.

The object image information includes 3D image information obtained by combining omnidirectional image data of one object captured through a plurality of cameras. In general, in spite of the omnidirectional image, only image information of the surface of the object may be acquired in many cases. That is, the object image information generally includes image information of surfaces of objects and image information up to a predetermined depth from the image. However, it is possible to measure the image up to a predetermined depth according to transparency and permeability unlike the physical surface ace. For example, through X-ray photography having high permeability, a 3D image including internal structure information of the object may be generated. When a 3D image is generated using software, 3D image information having complete 3D information may be generated unlike the captured image.

The scene image information may include omnidirectional information acquired at the current location through an image acquisition device such as Light Detection and Ranging (LiDAR). The object image information differs from the scene image information in that the object image information mainly uses image information obtained by capturing an object through a plurality of external cameras and the scene image information acquires omnidirectional image information at a specific location. The scene image information also includes 3D location information of the object, but differs from the object image information in that location information on only a part of the object shown from the central point is acquired. The scene image information may also use a plurality of LiDAR devices in order to extend a visible area.

A definite standard for processing the scene image information has not yet been determined. The object image information is reconstructed as a 2D image by separating the surface of the object in the form of patches. The location of each patch is determined as the 3D location according to a 3D shape of the object, and thus location information of each patch is stored to be linked with a 2D image or is stored as separate metadata. The scene image information may be processed using such a method of processing the object image information.

FIG. 20 illustrates scene image information used by a method of processing a 3D image according to the disclosure. The scene image information may be a point cloud image. An empty part in the center indicates the location of a LiDAR device. A LiDAR device may radiate a laser and the laser reflected by objects may be measured, and thus locations of the objects may be acquired. When one LiDAR device is used, an image may be acquired only for a shown object at the location of LiDAR, and accordingly, scene image information may be expressed on the surface of concentric spheres having the location of LiDAR as the center point.

Further, a LiDAR device may be installed in a vehicle and the vehicle acquires scene images through the LiDAR device in real time during movement of the vehicle, and thus 3D map data may be generated on the basis of the location of the vehicle and the acquired scene images. At this time, the location of the vehicle and time information on a time at which the location of the vehicle is measured may be acquired using a Global Position System (GPS) mounted to the vehicle.

However, since a part shown at a specific location is sufficient as required scene image information, the scene image information may be efficiently stored by mapping the scene image information to the surface of concentric spheres.

A color equirectangular projection (ERP) image and a depth ERP image may be generated on the basis of scene image information in FIG. 20.

In a process of acquiring an image according to the disclosure, an image acquisition device may acquire one or more point cloud images. The one or more point cloud images may be overlappingly displayed on one 3D coordinate. The one or more point cloud images may be dynamically acquired images. Specifically, the image acquisition device may acquire the one or more point cloud images, and may dynamically acquire the one or more point cloud mages while the image acquisition device is mounted to a vehicle and the vehicle moves. The point cloud images may include color, distance, and time information.

Figure 21:
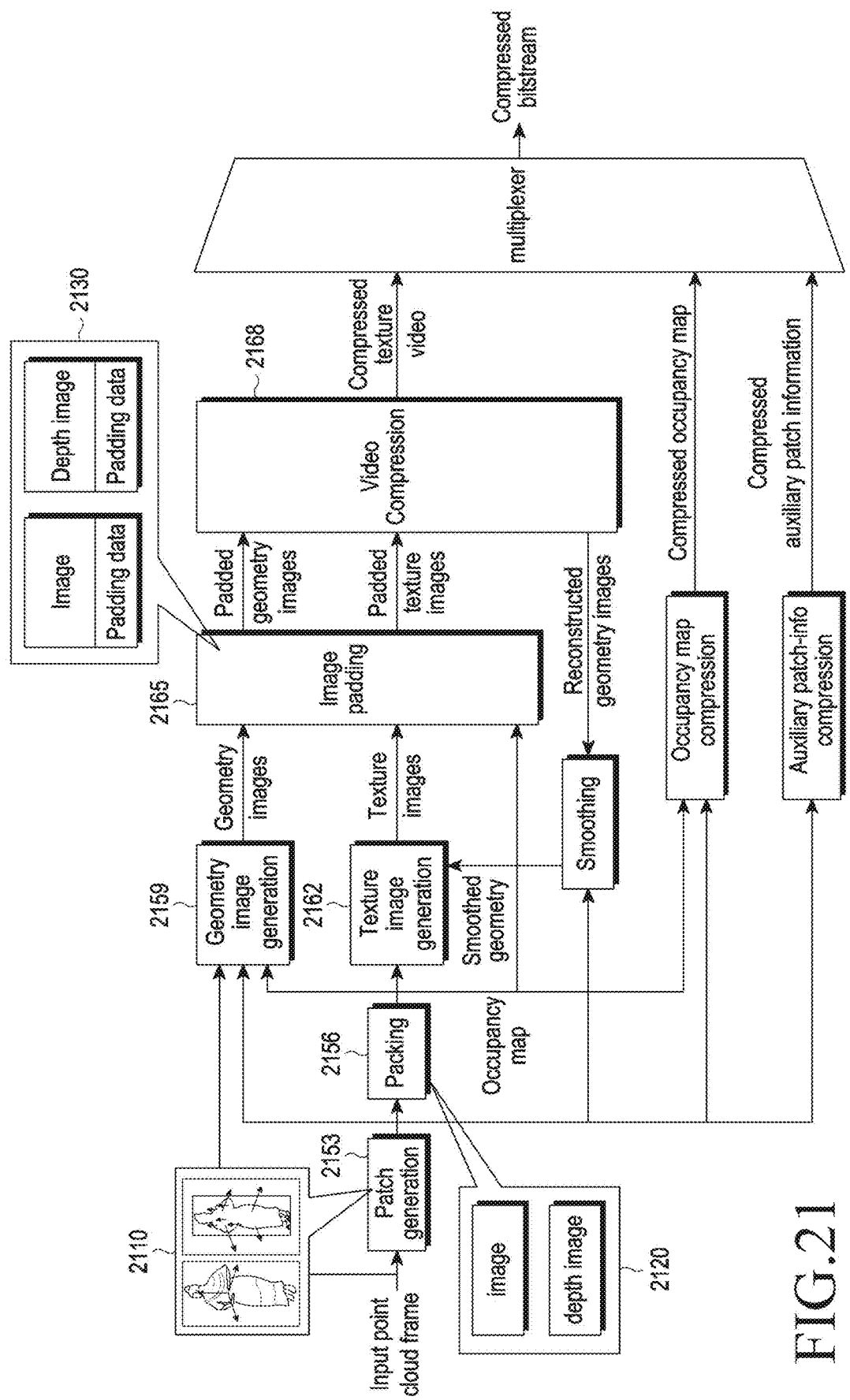
FIG. 21 illustrates a method of processing a point cloud image according to the disclosure.

FIG. 21 illustrates a method of processing a point cloud image according to the disclosure.

A Moving Picture Expert Group (MPEG) is discussing TMC1, TMC2, and TMC3 to process a point cloud image. However, TMC3 is not actively discussed. A method of processing image data of TMC3 using a processing method defined in TMC2 is proposed.

Test Model Categories (TMCs) include TMC1, TMC2, and TMC3 to process a point cloud image using the MPEG standard. TMC1 proposes a method of processing a 3D still image (static objects and scenes), TMC2 proposes a method of processing a 3D object video (dynamic objects), and TMC3 proposes a method of processing 3D map data (dynamic acquisition).

Hereinafter, a method of processing data of TMC3 using the standard of TMC2 is described.

For example, in TMC2, the surface of a 3D object image is divided and processed in the form of patches during a patch generation process. Further, a first 2D image including patches divided during a packing process is reconfigured, and a separate second 2D image including location information and depth information corresponding to the reconfigured first 2D image is generated.

A geometry image is generated on the basis of the first 2D image and the second 2D image, and a texture image is generated. Padding data is added to the generated geometry image and the generated texture image during an image padding process, and thus a padded geometry image and a padded texture image are generated. The padded geometry image and the padded texture image are output as a bitstream via video compression.

Occupancy map information may be generated according to distribution of patches of the first 2D image and the second 2D image. The occupancy map information may be compressed and transmitted. Further, additional patch information may be generated and compressed. The occupancy map information and the additional patch information may be included in a bitstream and transmitted, or may be included in separate metadata and transmitted.

Figure 22:
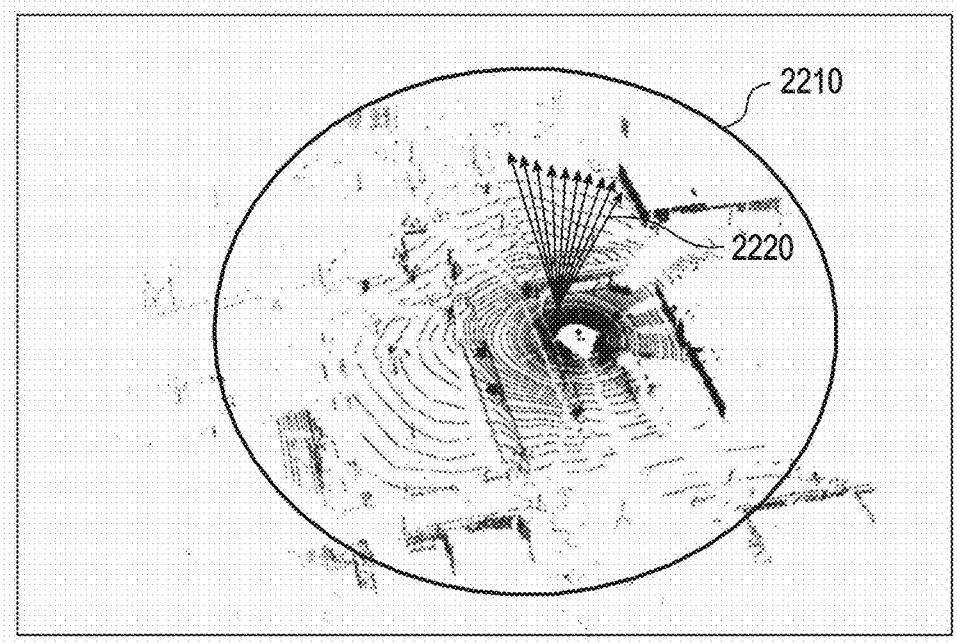
FIG. 22 illustrates a virtual concentric sphere corresponding to a point cloud image.

FIG. 22 illustrates a virtual concentric sphere corresponding to a point cloud image.

Referring to FIG. 22, 3D map data is expressed as a point cloud image. A virtual concentric sphere 2210 having the location of an image acquisition device as the center point is generated, and the location in the concentric sphere corresponding to each point of the point cloud image of 3D map data is acquired. A color equirectangular projection (ERP) image is generated by corresponding image information of points of the point cloud image to the location in the concentric sphere 2210, and a depth ERP image is generated by corresponding depth information of points of the point cloud image to the location in the concentric sphere. The points of the generated color ERP image correspond to points of the generated depth ERP image, respectively.

The center point of the concentric sphere 2210 is extended to a direction 2220 of one point of 3D map data and mapped to one point of the concentric sphere. Color information of the one point of the 3D map data is recorded to a location corresponding to the color ERP image, and depth information of the one point of the 3D map data is recorded to a location corresponding to the depth ERP image. In the ERP image, since the location of the surface of the concentric sphere is specified according to the location of a 2D image, the 3D map data may be reconstructed using the color ERP image and the depth ERP image. The ERP image and the depth ERP image may be generated by mapping all points of the 3D map data to corresponding points of the concentric sphere.

An ERP method is a method of projecting an image of a spherical surface to a 2D plane, which is similar to a Mercator projection method of a map projection method. As the Mercator projection method divides width and length according to longitude and latitude, the ERP method also uses the concept of longitude and latitude. The ERP image according to the ERP method indicates the unit of length from −90 degrees (South pole) to +90 degrees (North pole) as the unit of latitude, and indicates the unit of width from −180 degrees to +180 degrees as the unit of longitude or from 0 degrees to 360 degrees.

The ERP image according to the ERP method overestimates an area near the North pole and the South pole but relatively accurately estimates an area near the equator. As a method of packing an ERP image on the basis of the ERP method, there may be a method of packing the ERP image such that an ERP image near the North pole and the South pole is packed according to a triangular or trapezoidal packing method, that is, an area nearer the North pole and the South pole is further compressed and packed.

As described above, the ERP image includes location information in the image itself and thus has an advantage of a high compression rate and rapid processing, but has a disadvantage in that information on areas near the North pole and the South pole is overestimated and distortion is generated during a process of stitching and packing images.

Figure 23:
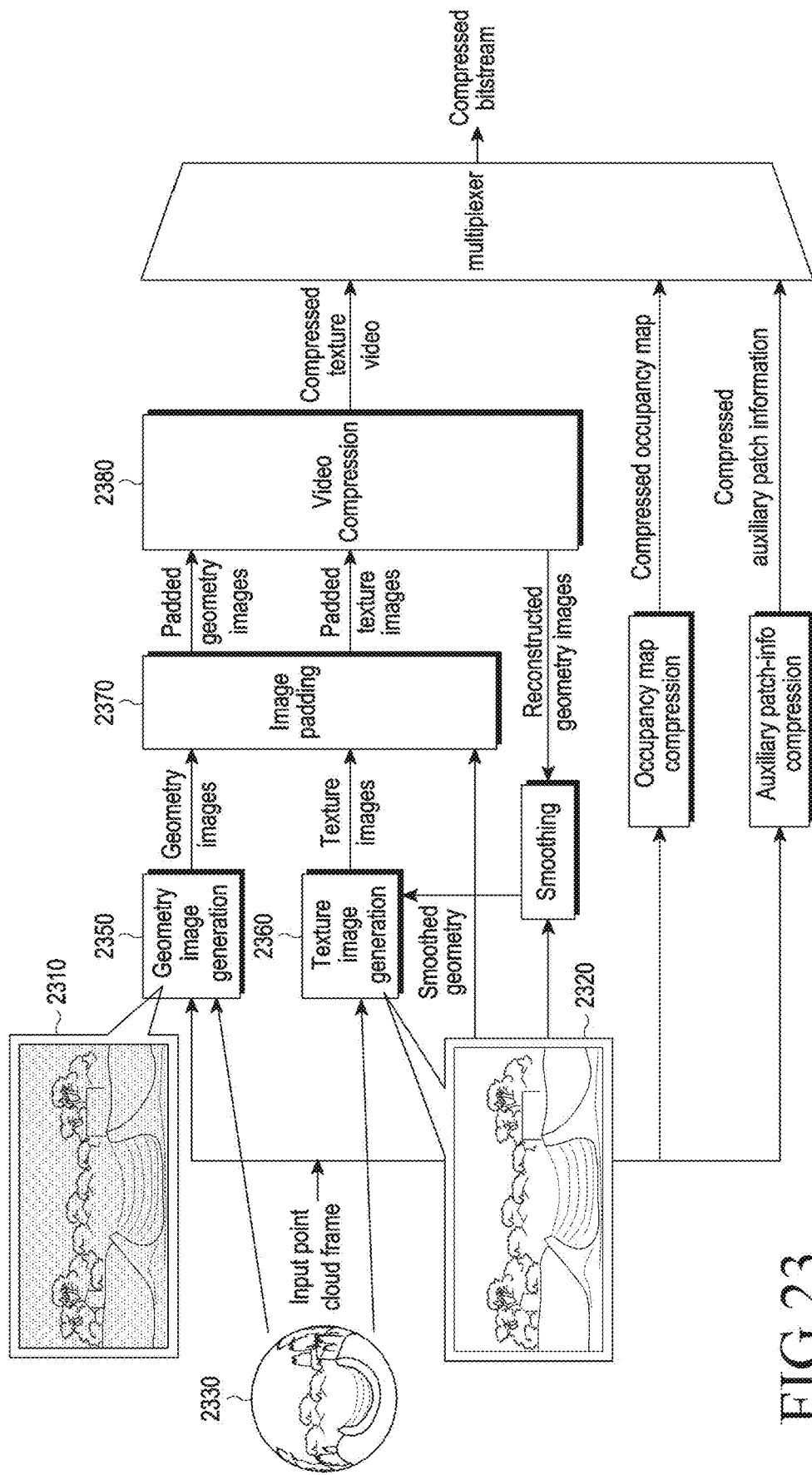
FIG. 23 illustrates an example of a method of processing a point cloud image on the basis of a color ERP image and a depth ERP image according to the disclosure.

FIG. 23 illustrates an example of a method of processing a point cloud image on the basis of a color ERP image and a depth ERP image according to the disclosure.

The color ERP image may be processed during a process of generating a geometry image of TMC2 of MPEG, and the depth ERP image may be processed during a process of generating text image of TMC2 of MPEG.

Referring to FIG. 23, a color ERP image 2310 and a depth ERP mage 2320 may be generated from 3D image information 2330. Specifically, the color ERP image 2310 may be generated during a process 2350 of generating a geometry image, and the depth ERP image 2320 may be generated during a process 2360 of generating a text image. This is only an example, and the depth ERP image 2320 may be generated during the process 2350 of generating the geometry image or the color ERP image 2310 may be generated during the process 2360 of generating the text image.

Pixels of a color ERP image may be processed according to an Alpha-Red-Green-Blue (ARGB) method, and pixels of a depth ERP image include depth information. Depth information of the pixels of the depth ERP image may have a linear scale value and a log scale value. In general, the depth information of the pixels of the depth ERP image has a value between a minimum depth value and a maximum depth value. Accordingly, the accuracy between the minimum depth value and the maximum depth value can be increased in proportion to the allowed data size by transmitting the minimum depth value and the maximum depth value through separate metadata or recording the same in a header of the depth ERP image.

When density of objects near the center point is high in a 3D image, depth information may be stored according to a log scale method and thus data storage efficiency may be increased. When density of objects between the minimum depth value and the maximum depth value is uniform, depth information may be stored according to a linear scale method and thus data storage efficiency may be increased.

In general, when a 3D scene image is acquired using LiDAR, remote objects are covered by objects near the center point, and as a result, the log scale method may be proper. When a plurality of scene images are acquired while a vehicle having LiDAR installed is moving and 3D map data is generated on the basis of the plurality of scene images, density of objects may be relatively uniform within a predetermined range in which case the linear scale method may be proper.

FIGS. 24(a), 24(b), and 24(c) illustrate examples of a method of generating a time ERP image according to the disclosure.

Points on concentric spheres correspond to 3D map data, and Light Detection and Ranging (LiDAR) may be used to acquire the map data. LiDAR rotates and scans along the spherical surface orthogonal to a direction from a start point (North pole) to an end point (South pole), and Part (a) of FIG. 24 illustrates movement of LiDAR while LiDAR rotates and scans in a direction from the North pole to the South pole. 3D map data can be acquired in a scanning order.

A method of processing an omnidirectional image may include an equirectangular projection (ERP) method. The ERP method corresponds to a method of projecting an image of the spherical surface into a rectangular area. Since an ERP image may be excessively expressed in a direction of the North pole and the South pole and an equatorial area is relatively accurately expressed, various methods of packing the ERP image are proposed.

Figure 24:
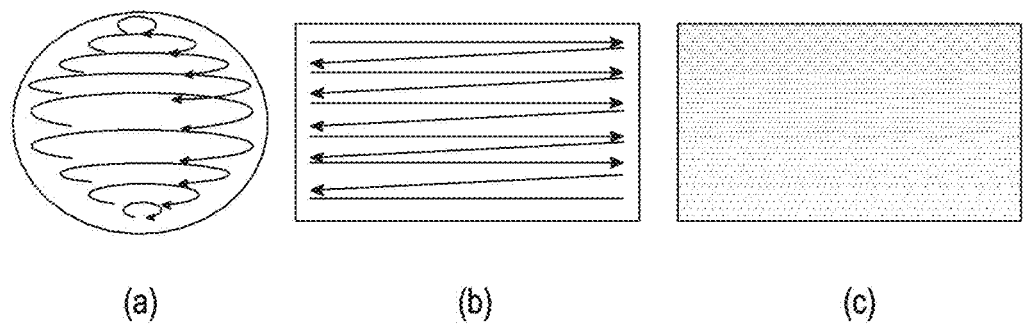
FIGS. 24(a), 24(b), and 24(c) illustrate examples of a method of generating a time ERP image according to the disclosure.

Part (a) of FIG. 24 illustrates a scanning order of LiDAR in 3D concentric spheres, Part (b) of FIG. 24 illustrates a scanning order in a 360 2D image (ERP image), and Part (c) of FIG. 24 illustrates a time ERP image obtained by expressing a scanning order in the ERP image through time data.

A scanning time of LiDAR has minute difference according to a rotation speed of LiDAR, and a scanning time at a corresponding location may be indicated to show a scanning order with reference to Parts (a), (b), and (c) of FIG. 24. A first time value and a last time value may be recorded in separate metadata or stated in a header of the time ERP image. For example, when 1 byte is used for a time value, a first time is expressed as 0 and a last time is expressed as 255, and thus values between the first time value and the last time value may be displayed while being divided into 255 parts. In general, the first time value and the last time value may be determined according to a unique characteristic of the LiDAR device, and accordingly, the scanning time of the LiDAR device may be calculated in advance experimentally according to the longitude and the latitude. However, the scanning time of the LiDAR device is required to be changed according to density of objects, in which case the scanning time is stated in each pixel of the time ERP image and thus the time corresponding to the color ERP image and the depth ERO image may be recognized. When a vehicle having the LiDAR device installed moves or observed objects move, location information of a 3D image may be more accurately reconstructed on the basis of a color ERP image, a depth ERP image, and a time ERP image.

Each pixel of Part (c) of FIG. 24 may be expressed by a number indicating a scanning time. A darker color may indicate earlier scanning and a lighter color may indicate later scanning, and vice versa. This is only for convenience of understanding, and there are various methods of making data from the scanning time. For example, the application similar to the actual time may be performed, and the scanning time may be indicated in units of time of log scales.

Figure 25:
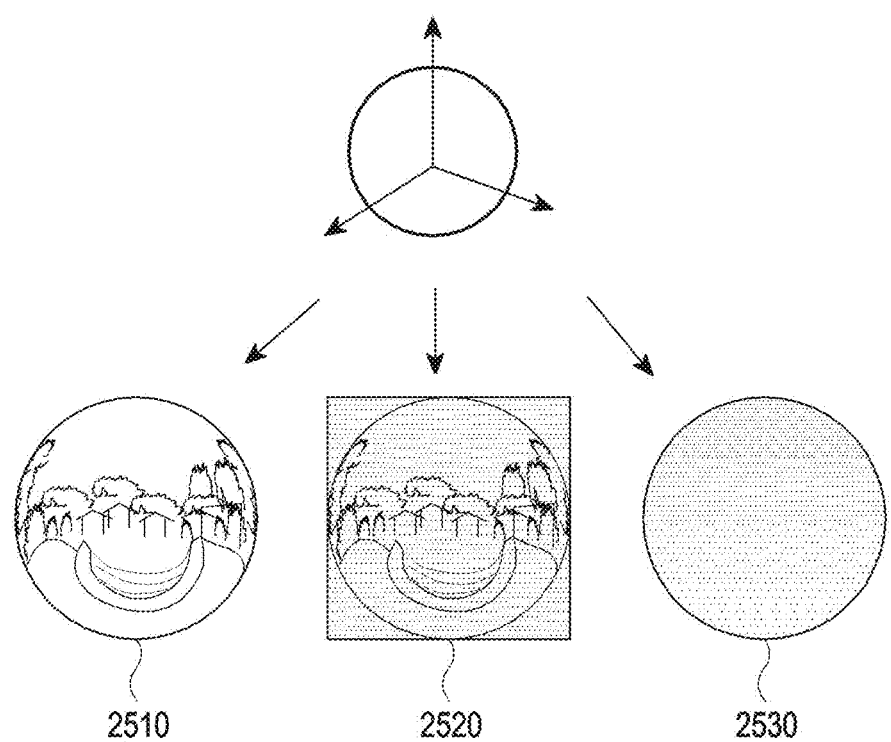
FIG. 25 illustrates a color ERP image, a depth ERP image, and a time ERP image according to the disclosure.

FIG. 25 illustrates a color ERP image, a depth ERP image, and a time ERP image according to the disclosure.

A color ERP image 2510, a depth ERP image 2520, and a time ERP image 2530 may be acquired from 3D map data. The color ERP image 2510, the depth ERP image 2520, and the time ERP image 2530 may be data-processed, encoded, compressed, and multiplexed according to the MPEG standard through a method of processing a 2D image.

Further, 3D map data may be generated on the basis of the received color ERP image 2510, the depth ERP image 2520, and the time ERP image 2530.

The ERP image 2510, the depth ERP image 2520, and the time ERP image 2530 may correspond to concentric spheres having the same origin.

Although the method using the color ERP image 2510, the depth ERP image 2520, and the time ERP image 2530 has been described as the method of processing the 3D map data, the ERP image 2510, the depth ERP image 2520, and the time ERP image 2530 may be used for a 3D point cloud image as well as the 3D map data. The 3D map data acquired using LiDAR does not have covered back 3D information, and thus 3D map data may be reconstructed using one concentric sphere on the basis of one color ERP image 2510 and one depth ERP image 2520. Of course, a plurality of color ERP images 2510 and a plurality of depth ERP images 2520 based on a plurality of concentric spheres may be used. However, the 3D point cloud image may have overlaid 3D information, and thus has difficulty in being expressed using one concentric sphere.

For the 3D point cloud image, the surface having 3D data is made to data segments in the form of patches, data is processed by adding depth information to the corresponding segment, a plurality of 2D data segments including depth information are generated for all pieces of 3D data, and then a plurality of generated 2D data segments are generated as 2D image data and transmitted. The received 2D image data is rearranged as the 3D point cloud image by separating and rearranging patches again.

At this time, it may be considered to generate the color ERP image and the depth ERP image by arranging the plurality of 2D data segments on a plurality of concentric spheres. When the 3D point cloud image is processed using a plurality of concentric spheres, there may be a disadvantage of a low compression rate due to the use of the plurality of concentric spheres, but there is no need to rearrange 2D data segments and thus an advantage of rapid image processing may be created.

When the color ERP images 2510 and the depth ERP images 2520 are generated on the basis of a plurality of concentric spheres, radiuses of the plurality of concentric spheres may correspond to the resolution of the ERP images. The radiuses of the plurality of concentric spheres may be constant, and radiuses of concentric spheres corresponding to objects farther from the center point may be shorter. It is possible to lower a weighted value of an object farther from the center point by reducing the resolution of the ERP image. Parts of objects are projected such that a part of an object closer to the surface of one concentric sphere is first projected and then a part of an object farther from the surface thereof is projected. However, as visible objects start to be projected, a remote object covered by a nearby object is projected onto another concentric sphere surface. Parts of objects which are the closest to the shown part are projected onto an initial concentric sphere and parts of objects having the visible part in a 3D image from which the closest objects are removed are sequentially projected onto a new concentric sphere. Such a process is repeated. If all objects existing in the 3D image are completely projected, generation of concentric spheres ends.

Of course, concentric spheres in closer areas are sequentially generated. However, it is natural that an object included in a concentric sphere in a close area is located farther from the center point of an object included in a concentric sphere in a remote area.

In order to process objects according to the distance from the center point, a concentric sphere group may be generated according to the distance from the center point of each concentric sphere. In this case, since objects can be processed according to the distance from the center point, there is an advantage of rapidly processing data but also a disadvantage of low data storage efficiency due to generation of a larger number of concentric spheres.

Center points of a plurality of concentric spheres included in the same group may be the same as or different from each other.

Radiuses of a plurality of concentric spheres included in one group may be the same as or different from each other, and the radius of the concentric sphere is determined as a value for allowing an attribute value to be effectively stored. For example, the radius of the concentric sphere may correspond to the resolution of the ERP image.

For each concentric sphere, attributes of the corresponding concentric sphere and radius size information of the corresponding concentric sphere may be stored and transmitted through separate metadata, or may be included in a header of the ERP image and then stored and transmitted.

An image acquisition device for acquiring a point cloud image may be LIDAR. When a point cloud image is acquired using a plurality of LiDAR devices, a plurality of concentric spheres may be used, and the number of center points of a plurality of concentric sphere groups may be plural.

Since one concentric sphere group has the same location of the center point, if there is a plurality of concentric sphere groups, the location of the center point of the concentric sphere may be stored and transmitted for each concentric sphere group.

Information on the center point of concentric spheres may be provided from an image acquisition device, and information on the number of image acquisition devices and coordinate information may be provided from the image acquisition devices.

Figure 26:
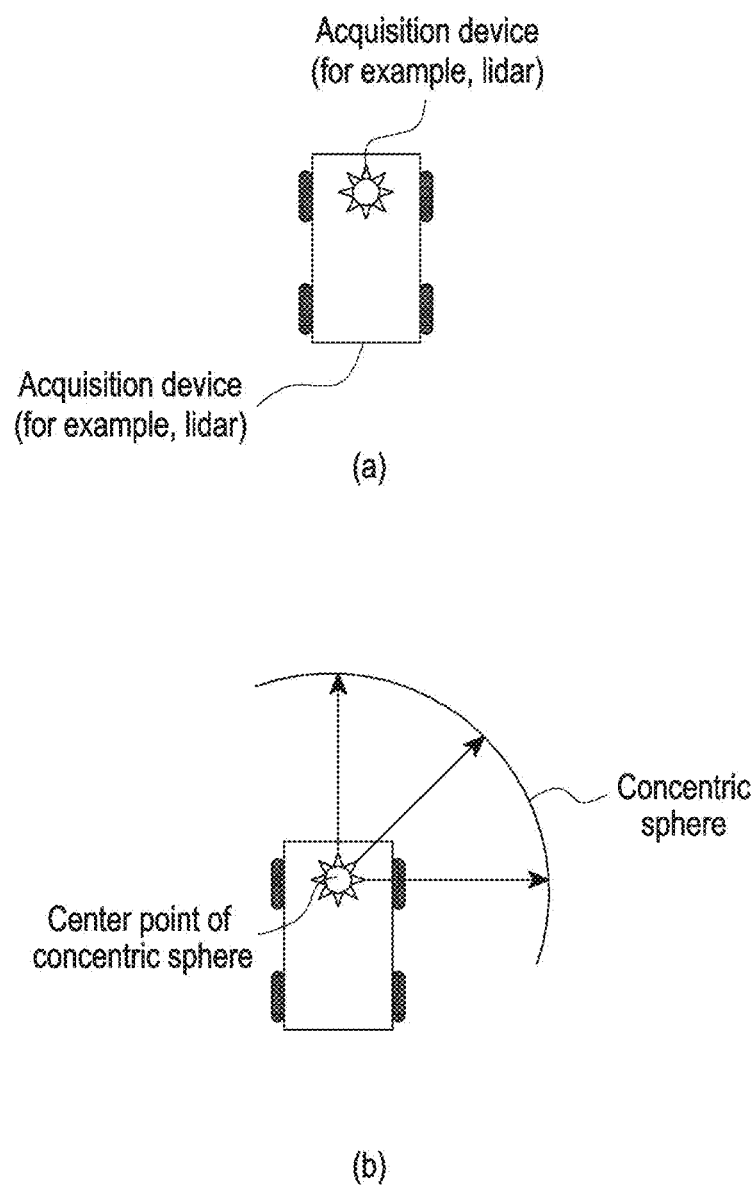
FIG. 26 illustrates arrangement of an image acquisition device according to the disclosure.

FIG. 26 illustrates arrangement of an image acquisition device according to the disclosure.

Information on a center point of concentric spheres may be acquired on the basis of information provided from the image acquisition device.

Center point coordinate information of concentric spheres and radius information of concentric spheres may be provided from the image acquisition device. The image acquisition device may be a Light Detection and Ranging (LiDAR) device.

The image acquisition device may be installed in an image acquisition vehicle such as an automobile.

Information provided from the image acquisition device may include the number of image acquisition devices and locations of the image acquisition devices in the vehicle.

The acquisition vehicle may include a GPS device and acquire location information and time information of the vehicle from the GPS device.

Figure 27:
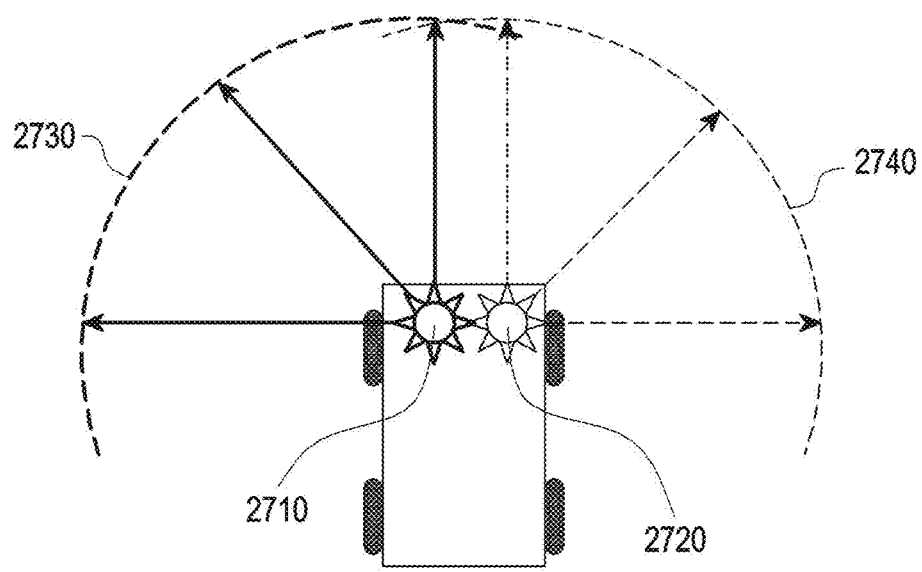
FIG. 27 illustrates arrangement of a plurality of image acquisition devices 2710 and 2720 according to the disclosure.

FIG. 27 illustrates arrangement of a plurality of image acquisition devices 2710 and 2720 according to the disclosure.

As attribute information, points have information indicating a concentric sphere or an acquisition device to which the points belong.

Information on the plurality of image acquisition devices may be acquired according to the plurality of image acquisition devices 2710 and 2720 and points 2730 and 2740 of point clouds.

A first image acquisition device 2710 is located at the center point of a first concentric sphere 2730, and a second image acquisition device 2720 is located at the center point of a second concentric sphere 2740. This is only an example drawing, and the number of image acquisition devices may be three or more.

Figure 28:
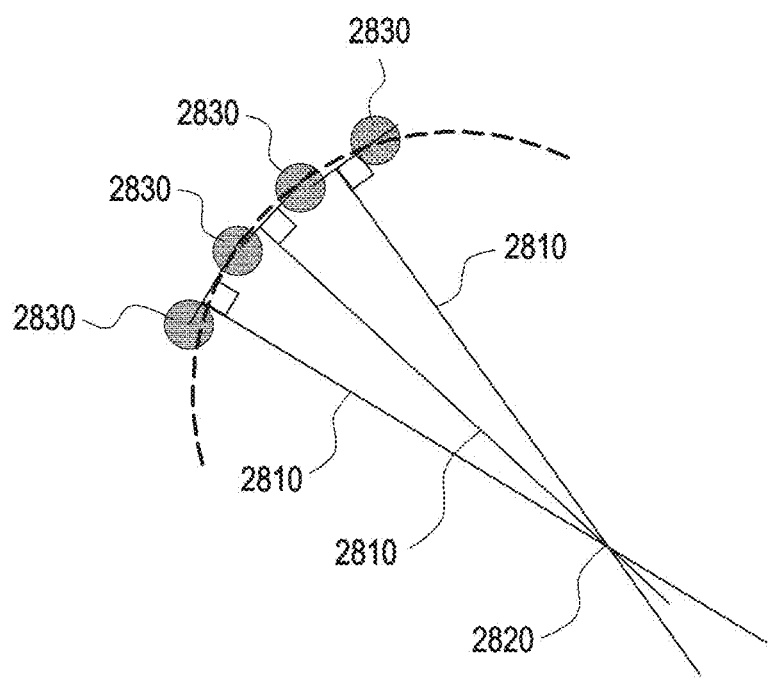
FIG. 28 illustrates a method of determining the center of concentric spheres according to the disclosure.

FIG. 28 illustrates a method of determining the center of concentric spheres according to the disclosure.

Normals may be acquired from points 2830 existing on concentric spheres. The center point of the concentric spheres may be obtained by extending the normals and using an intersection point of the normals.

The center point of concentric spheres may be acquired by specifying one point on concentric spheres, acquiring a nearby point having the same distance, generating a line perpendicular to a line obtained by connecting the two points and the center point of the two points, and performing the same work on other points. At this time, the perpendicular line is referred to as a normal.

Figure 29:
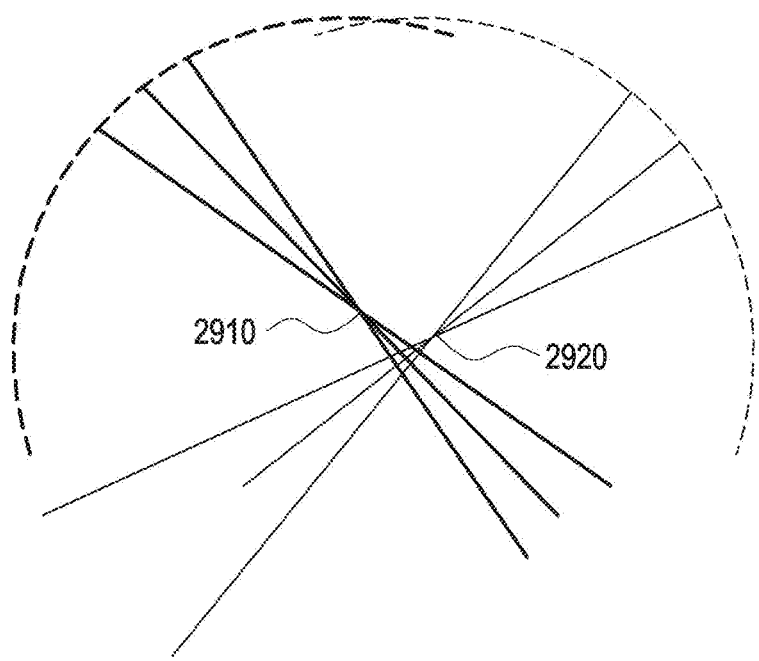
FIG. 29 illustrates a method of determining center points of a plurality of concentric spheres according to the disclosure.

FIG. 29 illustrates a method of determining center points of a plurality of concentric spheres according to the disclosure.

The center point of concentric spheres may be acquired of normals of points.

At this time, the number of center points of concentric spheres may be two or more. When the number of center points of concentric spheres is two or more, the concentric spheres are specified according to a plurality of center points. The points may be divided according to specified concentric spheres, and may be processed for each concentric sphere.

When a plurality of image acquisition devices are used, center points of concentric spheres may vary depending on the location of each image acquisition device. The points may be separately processed for each concentric sphere.

Figure 30:
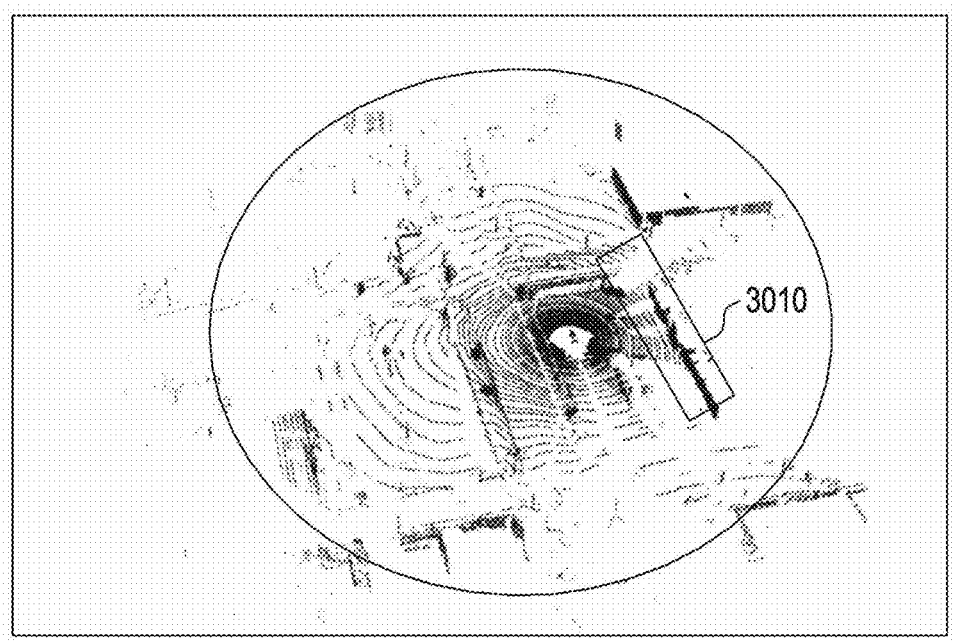
FIG. 30 illustrates a method of determining the center of concentric spheres according to the disclosure.

FIG. 30 illustrates a method of determining the center of concentric spheres according to the disclosure.

When points indicate structures located in a straight line such as buildings, if normals with adjacent points are calculated, the normals may be parallel to each other and thus prediction of the center point of concentric spheres may have an error. When points are arranged in the form of a straight line 3010, the points are not used for predicting the center point of concentric spheres, so that the center point of concentric spheres may be more accurately predicted.

Figure 31:
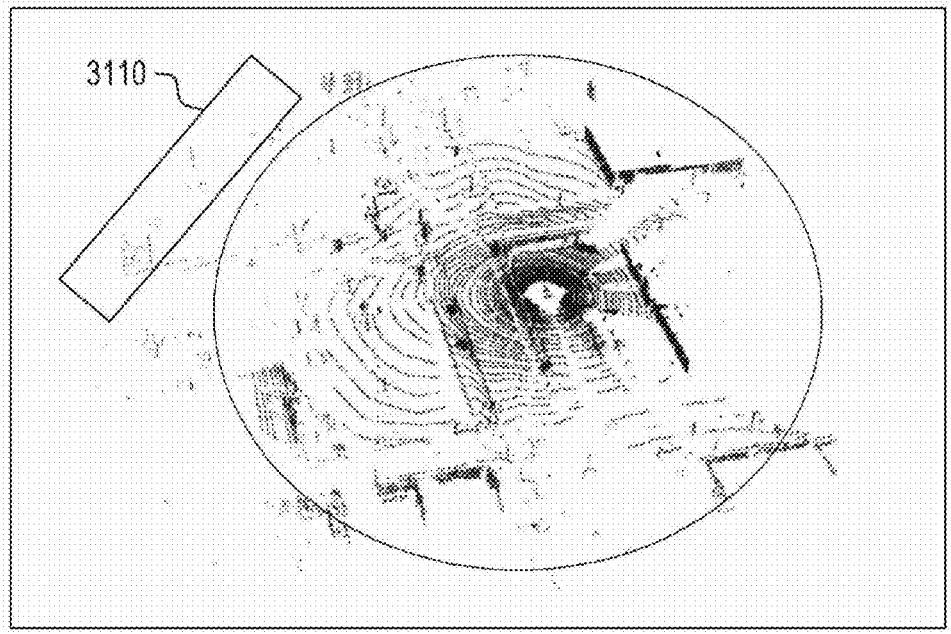
FIG. 31 illustrates a method of determining the center of concentric spheres according to the disclosure.

FIG. 31 illustrates a method of determining the center of concentric spheres according to the disclosure.

When points are spaced too far from the center point of concentric spheres, it may be inadequate to predict the center point of concentric spheres. It is possible to more accurately predict the center point of concentric spheres by using nearby points.

As a method of determining the center point of concentric spheres, the location at which the points can be observed without any overlapping may be selected as the center point of concentric spheres. When there are remote points covered by nearby points, the number of concentric spheres should be plural. An amount of required data increases according to the number of concentric spheres. However, a remote object covered by a nearby object in a forward image, observed at the center point of concentric spheres has low importance, the center point of concentric spheres may be determined such that the number of remote objects covered by the nearby object is as small as possible.

As another method of determining the center point of concentric spheres, a plurality of planes may be determined by grouping points. Each of the plurality of planes includes grouped points. The location at which as many planes as possible can be observed among the plurality of planes may be determined as the center point of concentric spheres. A plurality of point cloud images may be temporally or spatially successively arranged. An individual point cloud image may be referred to as a point cloud frame according to the temporal sequence or spatial sequence. One point cloud frame may have one center point. A movement path of center points may be determined by connecting center points of successive point cloud frames.

The center points of the point cloud frames may be controlled to be located in a continuous line.

Each of a plurality of concentric spheres may have one center point, and center points of different concentric spheres may be the same as or different from each other. The image acquisition method according to the disclosure proposes a method of generating a color ERP image, a depth ERP image, and a time ERP image corresponding to each concentric sphere.

Figure 32:
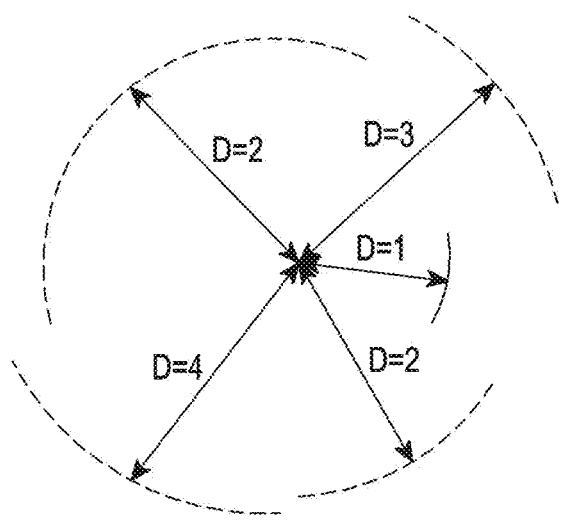
FIG. 32 illustrates a method of indicating depth information on concentric spheres according to the disclosure.
Figure 32:
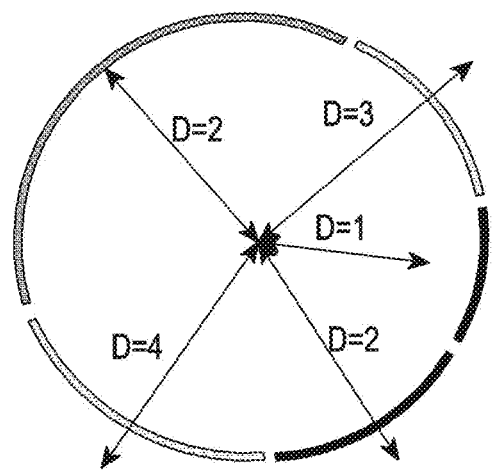

FIG. 32 illustrates a method of indicating depth information on concentric spheres according to the disclosure.

Part (a) of FIG. 32 illustrates distances of planes including grouped points from the center point. Some of the planes may be relatively close to the center point, and some thereof may be far from the center point.

Part (b) of FIG. 32 illustrates projection of the planes onto one sphere surface. Images projected onto the sphere surface may include a color sphere image, a depth sphere image, and a time sphere image. The color sphere image may be converted into a color ERP image, the depth sphere image may be converted into a depth ERP image, and the time sphere image may be converted into a time ERP image.

The color ERP image indicates a color projected onto the sphere surface without including depth information, but may acquire the depth information of each pixel of the color ERP image from the depth ERP image. 3D map data may be reconstructed on the basis of the color ERP image and the depth ERP image. The depth ERP image may express the depth information in the form of a number as illustrated in Part (b) of FIG. 32, and a depth value varies depending on a brightness of the color for convenience of understanding. Referring to Parts (a) and (b) of FIG. 32, a depth value is larger as a color is brighter, and a depth value is smaller as a color is darker.

Figure 33:
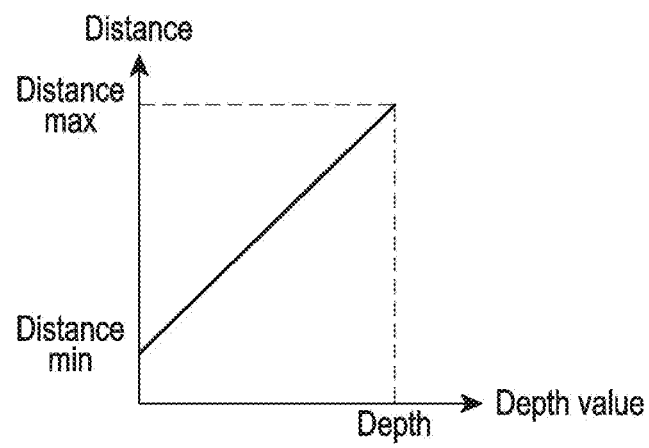
FIG. 33 illustrates a method of indicating depth information on concentric spheres according to the disclosure.
Figure 33:
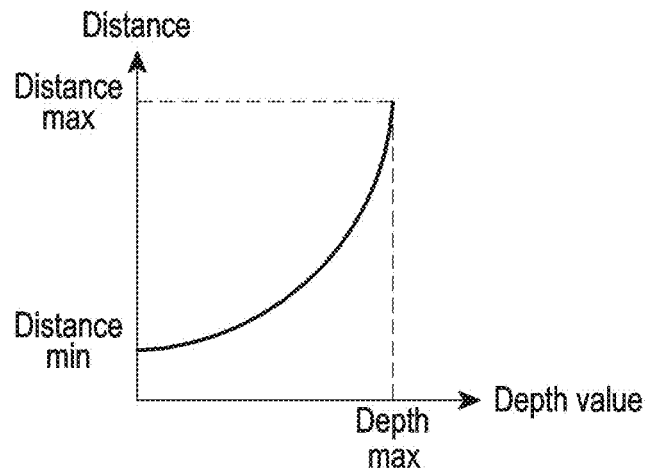

FIG. 33 illustrates a method of indicating depth information on concentric spheres according to the disclosure.

A depth value may be determined within a range from a minimum depth value to a maximum depth value. The minimum depth value and the maximum depth value may be predetermined values, the maximum depth value may be a significantly large value, and the minimum depth value may be an appropriately selected small value. The maximum depth value may be larger than the minimum depth value.

Part (a) of FIG. 33 illustrates a linear depth expression method, and Part (b) of FIG. 33 illustrates a log depth expression method.

When the maximum depth value and the minimum depth value are determined, a depth value scale may have a linear depth scale as illustrate din Part (a) of FIG. 33 or a log depth scale as illustrated in Part (b) of FIG. 33. The determination of the depth value may be performed according to distribution of objects based on depth. It is proper to determine an area in which density of objects is high according to a dense depth value scale and an area in which density of objects is low according to a somewhat loose depth value scale. However, it is difficult to control the depth value scale for each area before density of objects is analyzed for each area in a 3D image, and it may be proper to generate a depth ERP image by processing a depth value according to a linear scale or a log scale.

In the time ERP image, for a first time value and a maximum time value, a time value scale may be expressed by a linear scale or a log scale.

The first time value and the maximum time value may be stored as separate metadata, and the metadata may further include information on a depth value scale. The depth value scale may be one of a linear scale, a log scale, or a user-defining scale.

Attributes related to concentric spheres may include at least one piece of occupancy map information, concentric sphere group information, concentric sphere conversion information, and concentric sphere compression structure information.

The occupancy map information indicates whether there is information mapped to the surface of concentric spheres. That is, the occupancy map information indicates an area in which there is no information mapped to the surface of concentric spheres. It may be determined whether there is information mapped to the surface of concentric spheres on the basis of the occupancy map information.

Color sphere information, depth sphere information, time sphere information, and reflectivity sphere information corresponding to the surface of one concentric sphere may be included each of individual concentric spheres. The concentric sphere corresponding to the color sphere information, the depth sphere information, the time sphere information, and the reflectivity sphere information may be referred to as a color concentric sphere, a depth concentric sphere, a time concentric sphere, and a reflectivity concentric sphere, respectively.

Information mapped to the surface of concentric spheres may be converted to 2D information according to various projection methods. A used projection method may be stored and transmitted using signaling or metadata.

2D information converted from information on concentric spheres may be omnidirectional image information. The omnidirectional image information may be compressed by a video encoder. The omnidirectional image information may be expressed as an ERP image.

A plurality of concentric spheres may be converted into omnidirectional image information. When the plurality of concentric spheres are adjacent to each other, that is, when center points of the concentric spheres are adjacent and thus the concentric spheres overlap each other, information on the surface of concentric spheres may include duplicated information.

At this time, during compression by the video encoder, image data of an overlapping area may be processed on the basis of duplicated information of the plurality of concentric spheres.

Figure 34:
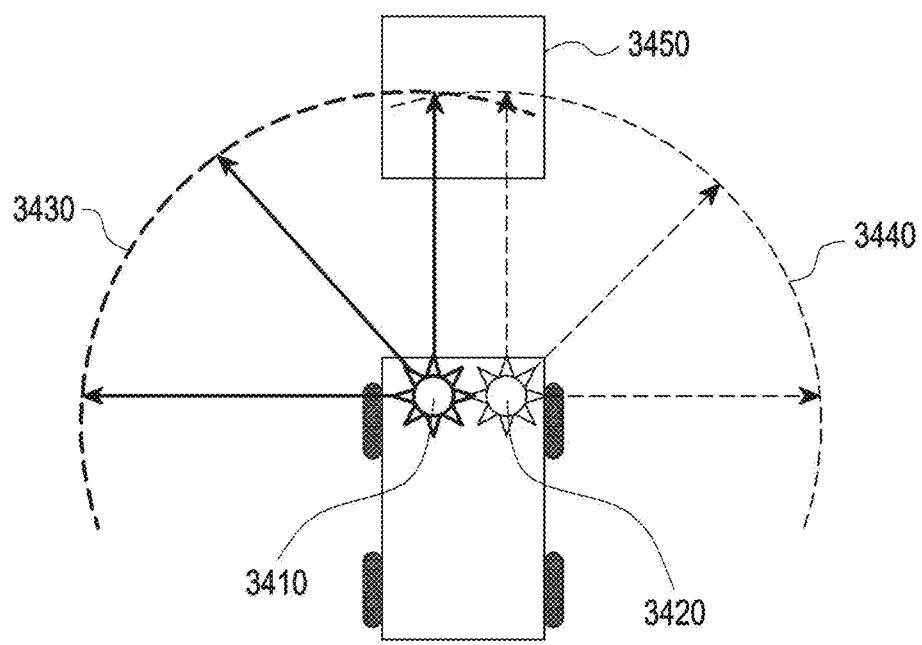
FIG. 34 illustrates a method of processing image information according to the disclosure.

FIG. 34 illustrates a method of processing image information according to the disclosure.

When a plurality of image acquisition devices 3410 and 3420 is installed in a vehicle, center points of the image acquisition devices are different from each other, and points acquired by the image acquisition devices may be separated according to different center points. Referring to FIG. 34, the first image acquisition device 3410 corresponds to a first concentric sphere 3430, and the second image acquisition device 3420 corresponds to a second concentric sphere 3440. The first concentric sphere 3430 and the second concentric sphere 3440 have an overlapping area 3450. 3D information of the overlapping area 3450 may be acquired in consideration of both information on the first concentric sphere 3430 and information on the second concentric sphere 3440.

Figure 35:
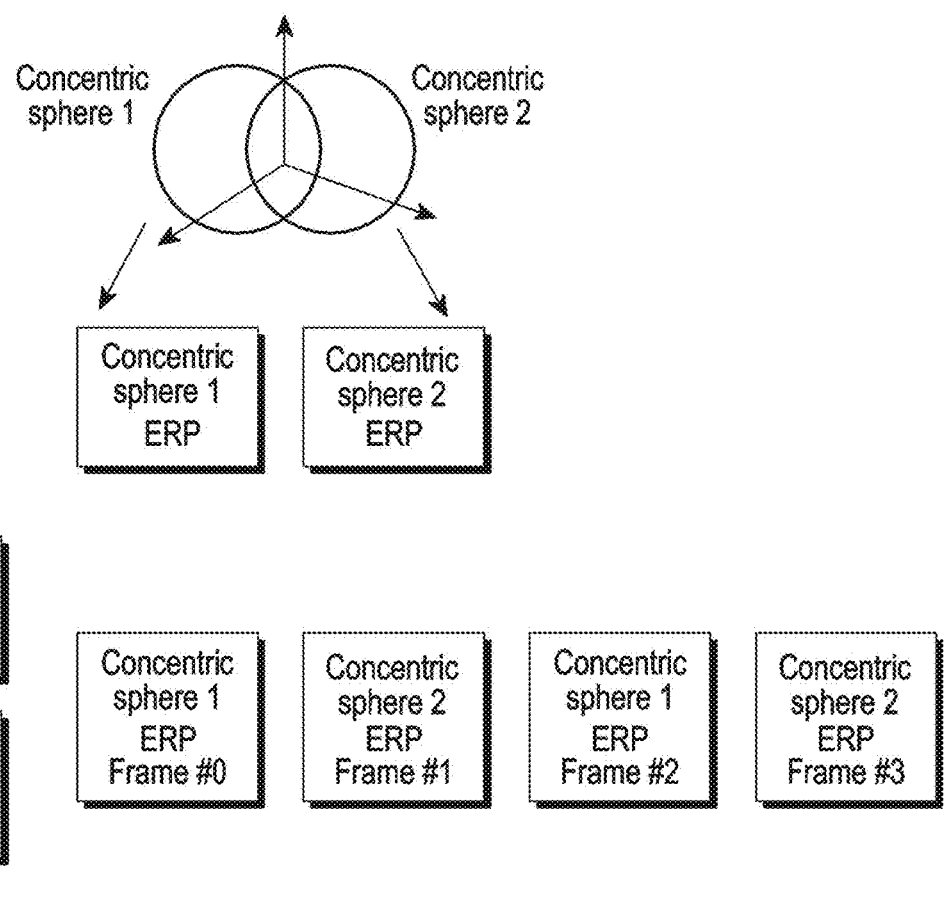
FIG. 35 illustrates a method of processing image information according to the disclosure.

FIG. 35 illustrates a method of processing image information according to the disclosure.

In order to process 3D information of the overlapping area 3450 of FIG. 34, one of a scalable codec method, a sub channel method, or a frame cross arrangement method.

According to the scalable codec method, a scalable image may be generated by adding information on the second concentric sphere to information on the first concentric sphere to generate a first ERP image in which the information on the first concentric sphere is improved and generating a second ERP image on the basis of only the information on the first concentric sphere.

According to the sub channel method, a third ERP image may be generated on the basis of the information on the first concentric sphere, and a fourth ERP image may be generated on the basis of the information on the second concentric sphere. The first ERP image may be processed using a main channel, and the second ERP image may be processed using a sub channel.

According to the frame cross arrangement method, the overlapping area 3450 may be efficiently processed by arranging, in a cross manner, first ERP image frames generated on the basis of the information on the first concentric sphere and second ERP image frames generated on the basis of the information on the second concentric sphere to combine the first ERP image frames and the second ERP image frames.

A color ERP image, a depth ERP image, and a time ERP image corresponding to one concentric sphere may be encoded together, or may be grouped and encoded for each of the color ERP image, the depth ERP image, and the time ERP image That is, only color ERP images are separately encoded, only depth ERP images are separately encoded, and only color ERP images are separately encoded.

Figure 36:
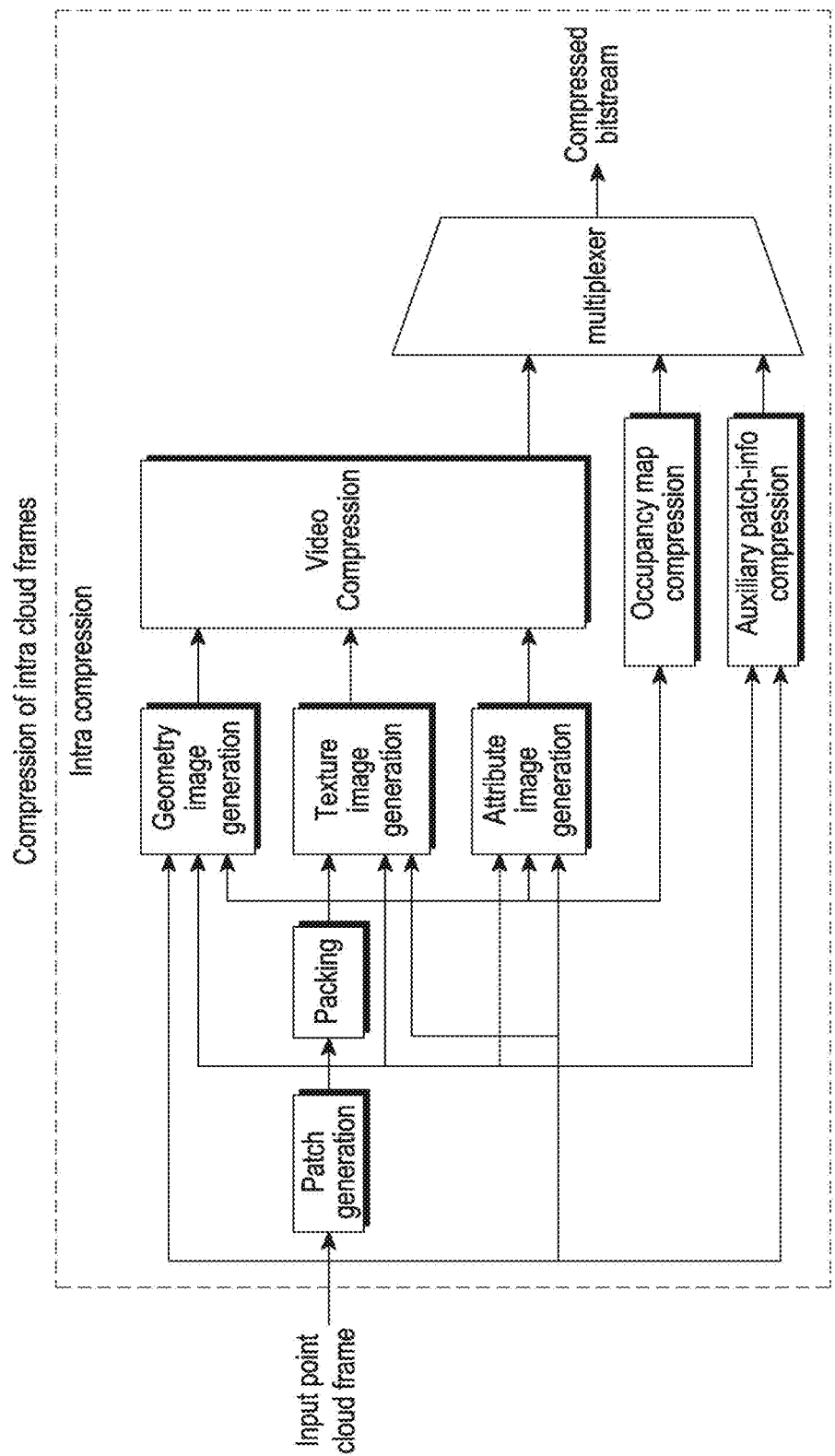
FIG. 36 is a mimetic diagram illustrating an intra frame compression process according to the disclosure.

FIG. 36 is a mimetic diagram illustrating an intra frame compression process according to the disclosure.

As a method of encoding a dynamic point cloud image according to the disclosure, methods using the conventional video codec on the basis of geometry image information, text image information, and attribute image information of a dynamic point cloud as three separate video sequences are proposed.

Separate metadata required for analyzing the three video sequences are divided and compressed. The metadata may include occupancy map information and auxiliary patch information. The metadata may occupy a small part of the entire bitstream, and may be efficiently encoded and decoded using software implementation. A large amount of information (geometry image information, text image information, and attribute image information) may be executed by a video codec (video compression).

Figure 37:
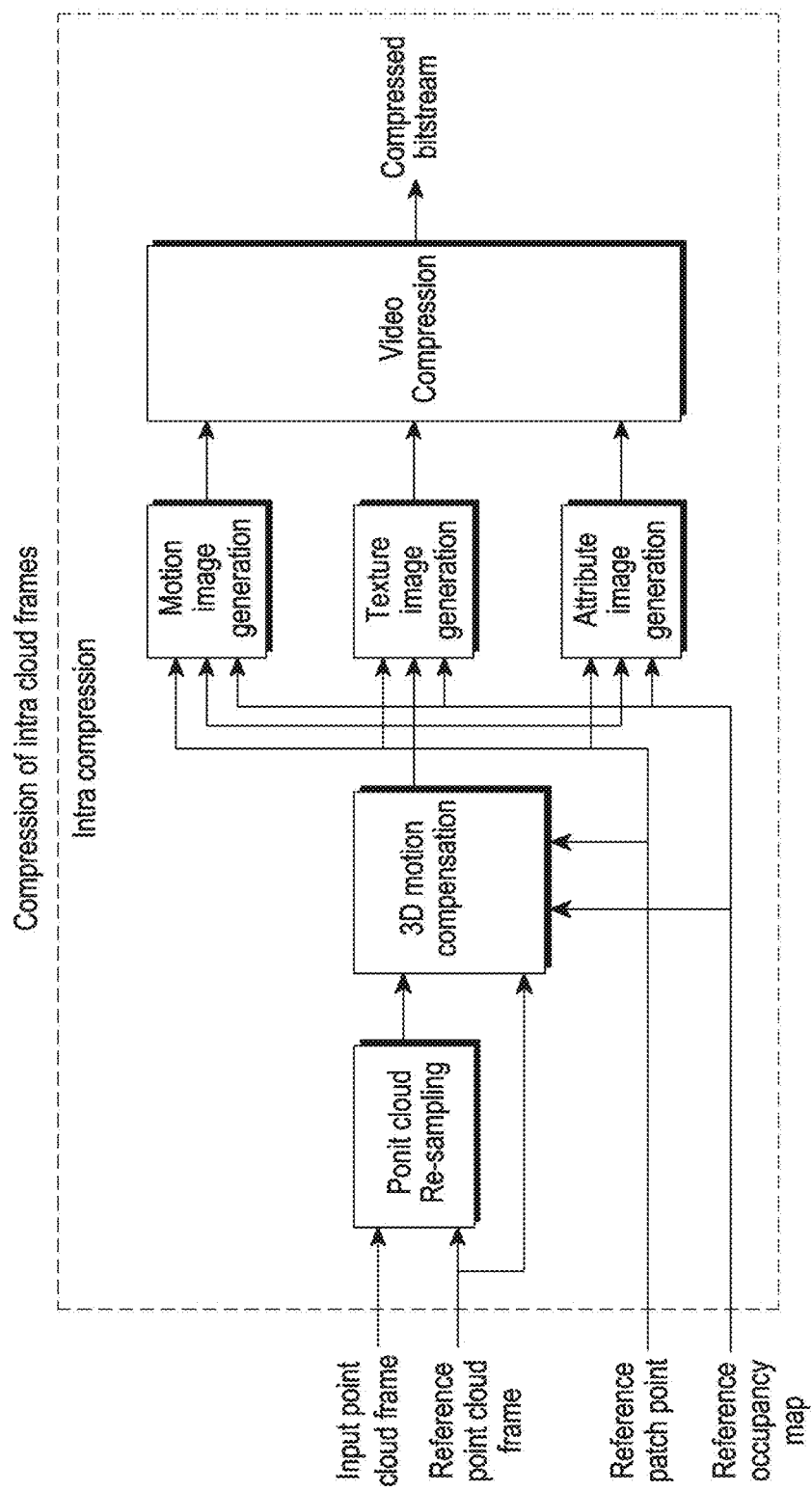
FIG. 37 is a mimetic diagram illustrating an inter frame compression process according to the disclosure.

FIG. 37 is a mimetic diagram illustrating an inter frame compression process according to the disclosure.

A patch generation process aims at minimizing a reconstruction error while separating a point cloud into a maximum of patches having soft boundaries. Encoders may perform various methods to generate the described separation.

A normal at each point may be predicted. Initial clustering of the point cloud may be acquired by connecting each point to one of an XY plane, a YZ plane, and a ZX plane on the basis of predicted normals.

More specifically, each point may be connected to a plane having the closest normal.

The initial clustering is improved by repeatedly updating a cluster index related to each point on the basis of cluster indexes of neighbors which are the closest to the normal of each point.

The last process includes extracting patches by applying a process of extracting a connected component.

A packing process may be performed on the basis of the extracted patches. In the packing process, the extracted patches are mapped to a 2D grid. Patches extracted, to minimize an area that is not used in the 2D grid and to guarantee the connection between all M×M (for example, 16×16) blocks of the 2D grid and a unique patch, to the 2D grid. The area that is not used is stored as occupancy map information.

M is a parameter defined by an encoder and encoded to a bitstream. M is set to a decoder.

Figure 38:
FIG. 38 illustrates a method of inserting patches into a grid according to the disclosure.

FIG. 38 illustrates a method of inserting patches into a grid according to the disclosure.

Simply, patches may be repeatedly inserted into a W×H grid. W and H are parameters defined by a user. W and H are determined to correspond to the resolution of an encoded geometry video image, text video image, and motion video image. For example, images on the surface of objects may be extracted in units of patches (16×16) and sequentially arranged on the W×H grid. The operation speed may be improved by arranging extracted patches to be adjacent to each other on the W×H grid according to the adjacent location of the extracted patches and simultaneously processing the adjacent patches when reconstructed.

In general, the location of patches is determined through an exhaustive search applied in a raster scan order. A first location at which insertion of a patch that does not overlap can be guaranteed is selected, and the use of a grid cell covered by the patch is indicated. If an empty space of the current resolution image is not suitable for the patch, a height H of the grid may increase to enlarge the W×H grid. The search applied in the raster scan order may be applied to the enlarged W×H grid. If all patches are inserted into the W×H grid, H is controlled according to the used grid cell. That is, a height of the W×H grid is decreased. In the case of a video sequence, a separate process may be performed to determine W and H for the whole Goal of Production (GOP).

After all patches are mapped to the grid, geometry image information, text image information, and motion image information of the point cloud image may be generated.

The geometry image, the text image, and the motion image may be stored as video frames and may be compressed using a video codec.

The method of processing a 3D image according to the disclosure may further include a process of generating occupancy map information.

An occupancy map includes a binary map indicating whether each cell of the grid is empty or belongs to a point cloud.

One cell of a 2D grid generates one pixel during an image generation process.

Metadata may be encoded and decoded for all patches.

The metadata may include at least one of an index of a projection plane, a 2D bounding box, and a 3D patch location.

Further, mapping information for each M×M block that provides a patch index related to each M×M block may be encoded and decoded.

A re-sampled block is used during an inter frame encoding process. A reference frame is transformed to smoothen a transform field as much as possible and is made to have the same shape as a target frame to be encoded. The transformed reference frame is finally painted again and considered as a re-sampled version of the target frame.

During the inter frame encoding/decoding process, a 3D motion compensation operation may be performed. A difference between the location of the reference point cloud and the location of the transformed version point cloud may be calculated, and the acquired motion field may include 3D motion vectors related to the reference frame point. Mapping of the 3D reference frame to the 2D reference frame may be used to convert the motion field to a 2D image.

A scale map that provides a scaling factor to each block of a motion image may be encoded.

An encoder may use a set of files describing one or more frames of the dynamic point cloud as an input. All of the location (geometry) and the color (texture) of the point cloud are integer values. An output of the encoder is a binary stream recorded in a disk.

The decoder receives a compressed bitstream file as an input and generates a set of files reconstructed using integer locations and colors.

Parameters may be acquired from command line arguments, and a video codec may be used as an external process. A path for an encoder/decoder execution file may be transmitted through parameters. Metadata may include the parameters. Parameters used to encode the geometry image, the text image, and a video stream of the motion image may be described in a separate configuration file (for example, metadata). A path related to the configuration file may also be transmitted through parameters.

Figure 39:
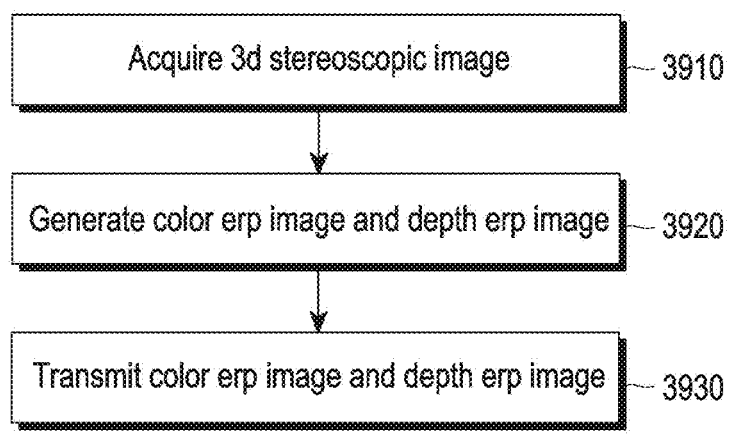
FIG. 39 is a flowchart illustrating a procedure of a method of acquiring an image according to the disclosure.

FIG. 39 is a flowchart illustrating a procedure of a method of transmitting an image according to the disclosure.

The method of transmitting the image according to the disclosure may include a process of acquiring a 3D stereoscopic image, a process of generating a color equirectangular projection (ERP) image from the 3D stereoscopic image, a process of generating a depth ERP image from the 3D stereoscopic image, and a process of transmitting the color ERP image and the depth ERP image.

Pixels of the color ERP image may correspond to pixels of the depth ERP image, respectively, each pixel of the color ERP image may include color information, and each pixel of the depth ERP image may include depth information of each pixel of the color ERP image.

The 3D stereoscopic image may be one piece of object image information and scene image information.

The object image information includes 3D image information of one or more objects. A 2D image may be generated by arranging patches covering the one or more objects in the outside, mapping points of the objects to one of the patches, and arranging the mapped patch. The patch may be arranged near a specific point of the object and by controlling an angle of the patch to minimize a sum of distances between the patch and points corresponding to the patch. Patches may be further generated in up, down, left, and right directions from the first patch, and no more patch is generated in a direction in which points do not exist.

Patches are continuously generated to map all points of the object. The generated patches may be stored in a 2D image, and depth information, transparency information, and reflectivity information of the generated patches may be stored in another 2D image.

A 2D image including color information of the patches may be referred to as a color 2D image, and a 2D image including depth information of the patches may be referred to as a depth 2D image.

The color 2D image may be generated during a geometry image generation process. The depth 2D image may be generated during a texture image generation process. The generated color 2D image and depth 2D image may be padded, compressed, and output as a bitstream.

In the scene image information, reflection of light radiated from an image acquisition device (for example, LiDAR) by an object is captured and a distance to the reflected location of the object is measured. LiDAR detects reflected light while generally rotating a reflector 360 degrees. 3D image data may be acquired by changing a vertical angle of the reflector whenever the reflector horizontally revolves 360 degrees. Depth information may be acquired using LiDAR.

A color omnidirectional image may be acquired using an omnidirectional camera. The omnidirectional camera may include one or more cameras, and the one or more cameras may include a fisheye lens or a wide-angle lens. 3D scene image information may be generated on the basis of the color omnidirectional image and a depth omnidirectional image, and the color ERP image and the depth ERP image may be acquired from the 3D scene image information. Alternatively, the depth omnidirectional image acquired from LiDAR may be converted to the depth ERP image, and the color omnidirectional image may be converted to the color ERP image.

The above described operations may be implemented by providing a memory device storing a corresponding program code to the entity of the communication system, the function, the base station, the terminal, or any structural element of the vehicle device. That is, the entity, the function, the base station, the terminal or the controller of the vehicle device carries out the above described operations by reading and executing the program code stored in the memory device by means of a processor or a CPU.

The entity, the function, the base station, the terminal or various structural elements of the vehicle device, modules and the like may be operated by using a hardware circuit, e.g., a complementary metal oxide semiconductor based logic circuit, firmware, software, and/or a combination of hardware and the firmware and/or software embedded in a machine readable medium. As an example, various electric configurations and methods may be carried out by using electric circuits such as transistors, logic gates, and an application specific integrated circuit (ASIC).

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. A method of transmitting an image, the method comprising:
   acquiring a 3D stereoscopic image;
   generating a color equirectangular projection (ERP) image and a depth ERP image from the 3D stereoscopic image;
   transmitting the color ERP image and the depth ERP image; and
   transmitting metadata including occupancy map information,
   wherein pixels of the color ERP image correspond to pixels of the depth ERP image, the pixels of the color ERP image include color information, and the pixels of the depth ERP image include depth information of the corresponding pixels of the color ERP image, and
   wherein the occupancy map information includes information indicating a location at which there is no image data of the color ERP image and the depth ERP image.

2. The method of claim 1, wherein the generating of the color ERP image and the depth ERP image from the 3D stereoscopic image comprises:
   forming concentric spheres having a feature point on a 3D coordinate as a center point;
   mapping points of the 3D stereoscopic image to surfaces of the concentric spheres;

generating the color ERP image, based on color information of the mapped points; and
generating the depth ERP image, based on depth information of the mapped points.

3. The method of claim 1, wherein the 3D stereoscopic image includes 3D location information of points and color information of the points.

4. The method of claim 3, wherein the 3D stereoscopic image further includes at least one piece of text information of the points, reflectivity information of the points, and transparency information of the points.

5. A method of reconstructing a 3D stereoscopic image, the method comprising:
receiving a color equirectangular projection (ERP) image and a depth ERP image;
reconstructing a 3D stereoscopic image, based on the color ERP image and the depth ERP image; and
receiving metadata including occupancy map information,
wherein pixels of the color ERP image correspond to pixels of the depth ERP image, the pixels of the color ERP image include color information, and the pixels of the depth ERP image include depth information of corresponding pixels of the color ERP image, and
wherein the occupancy map information includes information indicating a location at which there is no image data of the color ERP image and the depth ERP image.

6. The method of claim 5, wherein the reconstructing of the 3D stereoscopic image, based on the color ERP image and the depth ERP image comprises:
acquiring location information of a point corresponding to a pixel, based on depth information of the pixel of the depth ERP image and a location of the pixel of the depth ERP image, and
reconstructing location information and color information of a point of the 3D stereoscopic image by combining color information of a pixel of the color ERP image corresponding to the pixel of the depth ERP image and the corresponding location information of the pixel.

7. The method of claim 5, wherein the 3D stereoscopic image includes 3D location information of points and color information of the points.

8. The method of claim 7, wherein the 3D stereoscopic image further includes at least one piece of texture information of the points, reflectivity information of the points, and transparency information of the points.

9. An apparatus for transmitting an image, the apparatus comprising:
a transceiver; and
at least one processor connected to the transceiver configured to:
acquire a 3D stereoscopic image,
generate a color equirectangular projection (ERP) image and a depth ERP image from the 3D stereoscopic image,
transmit the color ERP image and the depth ERP image, and
transmit metadata including occupancy map information,
wherein pixels of the color ERP image correspond to pixels of the depth ERP image, the pixels of the color ERP image include color information, and the pixels of the depth ERP image include depth information of corresponding pixels of the color ERP image, and
wherein the occupancy map information includes information indicating a location at which there is no image data of the color ERP image and the depth ERP image.

10. The apparatus of claim 9, wherein the at least one processor is further configured to:
form concentric spheres having a feature point on a 3D coordinate as a center point,
map points of the 3D stereoscopic image to surfaces of the concentric spheres,
generate the color ERP image, based on color information of the mapped points, and
generate the depth ERP image, based on depth information of the mapped points.

11. The apparatus of claim 9, wherein the 3D stereoscopic image includes 3D location information of points and color information of the points.

12. The apparatus of claim 11, wherein the 3D stereoscopic image further includes at least one piece of text information of the points, reflectivity information of the points, and transparency information of the points.

13. An apparatus for reconstructing a 3D stereoscopic image, the apparatus comprising:
a transceiver; and
at least one processor connected to the transceiver configured to:
receive a color equirectangular projection (ERP) image and a depth ERP image,
reconstruct a 3D stereoscopic image, based on the color ERP image and the depth ERP image, and
receive metadata including occupancy map information,
wherein pixels of the color ERP image correspond to pixels of the depth ERP image, the pixels of the color ERP image include color information, and the pixels of the depth ERP image include depth information of corresponding pixels of the color ERP image, and
wherein the occupancy map information includes information indicating a location at which there is no image data of the color ERP image and the depth ERP image.

14. The apparatus of claim 13, wherein the at least one processor is further configured to:
acquire location information of a point corresponding to a pixel, based on depth information of the pixel of the depth ERP image and a location of the pixel of the depth ERP image, and
reconstruct location information and color information of a point of the 3D stereoscopic image by combining color information of a pixel of the color ERP image corresponding to the pixel of the depth ERP image and the corresponding location information of the pixel.

15. The apparatus of claim 13, wherein the 3D stereoscopic image includes 3D location information of points and color information of the points.

16. The apparatus of claim 15, wherein the 3D stereoscopic image further includes at least one piece of texture information of the points, reflectivity information of the points, and transparency information of the points.

* * * * *